United States Patent [19]

Kostreski et al.

[11] Patent Number: 5,734,589
[45] Date of Patent: Mar. 31, 1998

[54] DIGITAL ENTERTAINMENT TERMINAL WITH CHANNEL MAPPING

[75] Inventors: Bruce Kostreski, Wheaton; Henry G. Hudson, Jr., Annapolis, both of Md.; Nick Davis, Warrenton, Va.

[73] Assignee: Bell Atlantic Network Services, Inc., Arlington, Va.

[21] Appl. No.: 380,755

[22] Filed: Jan. 31, 1995

[51] Int. Cl.$^6$ ................................................ H04N 7/10
[52] U.S. Cl. ............................ 364/514 A; 364/514 C; 348/6; 348/7; 348/10; 455/3.1
[58] Field of Search ........................ 364/514 A, 514 C; 348/6, 7, 10, 13, 487; 455/3.1, 4.2, 6.3

[56] References Cited

U.S. PATENT DOCUMENTS

| | | | |
|---|---|---|---|
| 4,506,387 | 3/1985 | Walter | 455/612 |
| 4,527,194 | 7/1985 | Sirazi | 358/86 |
| 4,623,920 | 11/1986 | Dufresne et al. | 358/122 |
| 4,677,685 | 6/1987 | Kurisu | 455/4 |
| 4,706,121 | 11/1987 | Young | 358/142 |
| 4,709,418 | 11/1987 | Fox et al. | 455/612 |
| 4,712,239 | 12/1987 | Frezza et al. | 380/20 |
| 4,816,905 | 3/1989 | Tweedy et al. | 358/86 |
| 4,829,372 | 5/1989 | McCalley et al. | 358/86 |
| 4,894,714 | 1/1990 | Christis | 358/86 |
| 4,912,552 | 3/1990 | Allison, III et al. | 358/84 |
| 4,949,187 | 8/1990 | Cohen | 358/335 |
| 4,963,995 | 10/1990 | Lang | 358/335 |
| 4,982,430 | 1/1991 | Frezza et al. | 380/50 |
| 5,010,499 | 4/1991 | Yee | 364/521 |
| 5,014,125 | 5/1991 | Pocock et al. | 358/86 |
| 5,027,400 | 6/1991 | Baji et al. | 380/20 |
| 5,051,822 | 9/1991 | Rhoades | 358/86 |
| 5,057,932 | 10/1991 | Lang | 358/335 |
| 5,119,188 | 6/1992 | McCalley et al. | 358/86 |
| 5,121,476 | 6/1992 | Yee | 395/154 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,136,411 | 8/1992 | Paik et al. | 359/127 |
| 5,142,680 | 8/1992 | Ottman et al. | 395/700 |
| 5,166,886 | 11/1992 | Molnar et al. | 364/479 |
| 5,181,107 | 1/1993 | Rhoades | 358/86 |
| 5,189,673 | 2/1993 | Burton et al. | 370/110.1 |
| 5,192,999 | 3/1993 | Graczyk et al. | 358/85 |
| 5,208,665 | 5/1993 | McCalley et al. | 358/86 |

(List continued on next page.)

FOREIGN PATENT DOCUMENTS

| | | |
|---|---|---|
| 1-288421 | 9/1991 | Japan . |
| WO 94/23537 | 10/1994 | WIPO . |

OTHER PUBLICATIONS

A. D. Gelman, "A Store–And–Forward Architecture For Video–On–Demand Service", IEEE Conference, Jun. 23–26, 1991, Denver, Colorado, Communications: Rising To The Heights, vol. 2 of 3, 23 Jun. 1991.

Primary Examiner—James P. Trammell
Assistant Examiner—Patrick J. Assouad
Attorney, Agent, or Firm—Lowe, Price, LeBlanc & Becker

[57] ABSTRACT

Dynamic programming of a digital entertainment terminal (DET) facilitates operation of the terminal to offer a variety of functionally different broadband services. The terminal includes a network interface module which couples the terminal to a specific type of communication network for receiving a digital broadband channel. The DET downloads on a narrowband signaling channel a VIP program map that identifies the available video information service providers (VIPs) on the basis of the location of their corresponding software control signals. The software control signals are transmitted cyclically to enable access by a random DET at any time. A program memory captures the VIP program map and at least a portion of the software control signals received over the digital broadband channel as software executable by the control processor during turn-on of the DET. When a user presses a GUIDE button on a remote control service, the DET displays the available information service providers in accordance with the VIP program map, thereby enabling the user to conveniently access the broadband services offered by the selected information service provider.

62 Claims, 5 Drawing Sheets

U.S. PATENT DOCUMENTS

| | | | |
|---|---|---|---|
| 5,220,420 | 6/1993 | Hoarty et al. | 358/86 |
| 5,231,494 | 7/1993 | Wachob | 358/146 |
| 5,239,540 | 8/1993 | Rovira et al. | 370/77 |
| 5,247,347 | 9/1993 | Litteral et al. | 358/85 |
| 5,249,044 | 9/1993 | VonKohorn | 358/86 |
| 5,253,275 | 10/1993 | Yurt et al. | 375/122 |
| 5,335,277 | 8/1994 | Harvey et al. | 380/20 |
| 5,341,425 | 8/1994 | Wasilewski | 380/20 |
| 5,361,091 | 11/1994 | Hoarty et al. | 348/7 |
| 5,373,288 | 12/1994 | Blahut | 340/825.08 |
| 5,379,421 | 1/1995 | Palazzi, III et al. | 395/600 |
| 5,400,401 | 3/1995 | Wasilewski | 380/9 |
| 5,410,326 | 4/1995 | Goldstein | 348/134 |
| 5,418,782 | 5/1995 | Wasilewski | 370/73 |
| 5,421,017 | 5/1995 | Scholz et al. | 395/700 |
| 5,440,632 | 8/1995 | Bacon et al. | 380/20 |
| 5,442,389 | 8/1995 | Blahut et al. | 348/7 |
| 5,481,542 | 1/1996 | Logston et al. | 370/94.2 |
| 5,539,822 | 7/1996 | Lett | 380/20 |
| 5,544,161 | 8/1996 | Bigham et al. | 370/58.1 |

DIGITAL ENTERTAINMENT TERMINAL WITH CHANNEL MAPPING

TECHNICAL FIELD

The present invention relates to a programmable digital entertainment terminal (DET) for use in digital video program distribution networks, to systems and methods for dynamically programming such a terminal to offer a variety of functionally different broadband services, and to several specific interactive services offered through such networks and terminals.

BACKGROUND ART

Set top terminal devices commonly in use in cable television systems today have a number of limitations. First, the devices are limited to processing of analog television signals. Also, cable television terminal devices are generally "dumb" devices having a limited set of functionalities constrained by the hard wired programming of the internal micro-processor controlled device. Essentially all cable television terminal devices respond to a selection input from the subscriber, tune to a selected channel available on the cable television network, decode the video program material if scrambled, and provide output signals compatible with a standard television receiver.

Enhanced cable television terminals do provide some additional features, such as graphics overlay capability and two way communication of control signalling to and from headend terminal devices. Although such improved terminals facilitate some enhanced services, such as home shopping and purchasing, the performance of these cable television set top terminals is still limited to analog decoding. Also the range of services is still limited by the hard wired capabilities of the microprocessor within the set-top terminal devices.

Proposals have been made to download computer executable code over cable television networks. In particular, U.S. Pat. Nos. 5,051,822 and 5,181,107 both to Rhoades disclose a terminal device connectable to a cable television network and a telephone line. A subscriber requests a video game or other software stored in a remotely located software storage center by operating the terminal to establish a bi-directional telephone link with the remote storage center. The center transmits the encoded software program together with the terminal identification code as a digital bit stream over a television broadcast channel. The terminal requesting the software monitors all digital bit streams on the broadcast channel but receives only the software program addressed to it, i.e. only after identification code validation occurs. Once reception of all the software data is complete, the terminal acknowledges receipt to the remote storage center and drops the telephone line. The encoded software program is decoded, and the terminal provides a display informing the subscriber that the game or other program is ready for use. The terminal also offers the subscriber the means to interact with the software, e.g. play the game, using contemporary gaming control or input devices. While the Rhoades terminal structure does provide enhanced capabilities, such as video games and home shopping, the display functionality controlled by the downloaded software is limited to computer displays generated in response to the software, there is no direct interaction of the received software with any video program carried on the cable network. The downloaded software does not control further instructions with the storage center. Also, the video transmissions on the cable system are analog, and a separate telephone connection is required for selection inputs to the central storage facility. Furthermore, the terminal device apparently can receive software from the storage center of only one service provider.

Some prior art systems do permit downloading into the cable television decoder itself, however, it is believed that this downloading of information into the decoder has been limited to information controlling the decoding of the television program signals, e.g. a key word used in a descrambling algorithm. Dufresne et at., in U.S. Pat. No. 4,623,920 teach a specific scheme for addressing data transmissions over a cable television network to groups of terminals or to individual terminals. The addressed data sent from the head end can include an option table of signals for controlling descrambling of available television programs, data to enable operation of a cable TV converter, or software for operating a peripheral microcomputer separate from the cable television terminal device. The Dufresne et al. terminal is limited to reception of data from only one service provider, i.e. the provider operating the cable TV network. Also, the services provided through the terminal are limited in that the downloaded data apparently does not alter or control the terminal functionality for further interactions with the provider through the network.

Recently, several different wideband digital distribution networks have been proposed for offering subscribers an array of video services, such as Video On Demand. The following U.S. Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, U.S. Pat. No. 5,027,400 to Baji et al., and U.S. Pat. No. 4,506,387 to Walter. The terminal devices in these digital networks are still limited functionality devices. In these networks, the digital terminal devices still only receive selection inputs, transmit selection signals upstream to the source of the video materials, receive downstream video transmissions, decompress the digitized video materials and convert to analog form, and provide appropriate signals to a television receiver. One example of such a digital video distribution network and the terminal device for such a network, disclosed in Litteral et al. U.S. Pat. No. 5,247,347, will be described in more detail below.

U.S. Pat. No. 5,247,347 to Litteral et al., the disclosure of which is hereby incorporated in its entirety into this disclosure by reference and over which the present invention is an improvement, discloses an enhanced public switched telephone network which also provides a video on demand service to subscribers over the Public switched telephone network. A menu of video programming information is displayed at the subscriber's premises by a set-top terminal and a TV set. The subscriber may transmit ordering information via the Public switched telephone network to the independent video information providers. Video programming may be accessed and transmitted to the subscriber directly from a video information provider (VIP) or through a video buffer located at a central office (CO) serving the subscriber.

The above detailed discussion of the Litteral et al. system shows that prior art digital distribution networks offer enhanced video services, but the terminal device functionality is still limited to program selection, decoding and display. Also, the interactive services provided require a full wideband channel to each DET, dedicated entirely to that DET, for the entire session.

A number of suggestions have been made in the press regarding arrays of different services which will become available through broadband digital networks now popularly referred to as the "Information Super Highway". If a different VIP were to offer a different service, the VIP can limit the service to an interactivity with the subscriber essentially corresponding to the functionality available in the terminal device. This approach, however, limits the functional capabilities the new VIP may choose for the different service. Alternatively, the subscriber must buy another terminal device programmed or wired to function in accord with the VIP's new service. This second approach, however, forces the subscriber to purchase and connect up a different terminal device for each different service subscribed to.

An additional problem arises with accessing the different available video information providers using the set-top terminal devices. For example, existing set top terminal devices used in cable television systems today process available analog television signals on the basis of the RF channel that carries the broadcast signal. Since cable television companies may offer a large number of broadcast services on over one hundred channels, a user of the set top terminal devices needs to scan over numerous undesirable channels before locating a desired channel. In addition, since the cable television company assigns broadcast channels to different RF channels for transmission, the user who is accustomed to conventional channel assignments may become confused by arbitrary channel assignments made by the cable television company. For example, local stations NBC, ABC, CBS, FOX, and PBS may be conventionally broadcast at RF Channels 4, 7, 9, 5, and 26; however, a cable company may reassign those local stations to channels 24, 27, 29, 30, and 55. Thus, the user is unable to quickly locate desired programs from less preferred programs.

As local networks begin to offer digital broadband services, the addition of video information providers on channels selected by the network will cause greater confusion for the user. Considering an expansion of the above cable TV model to a multiple provider network, for example, five providers might each offer up to a hundred channels, each carried on an arbitrary network channel. Thus, even though the user may benefit from a greater availability of services, the user may become frustrated and confused from the inability to manage the large amount of channels and information.

From the above discussion it becomes clear that a need exists in the art for set-top terminal devices that process compressed, broadband digital audio video information and that are readily adaptable to perform a variety of related functionalities as needed to facilitate a range of audio/video and interactive services offered by a large number of information providers.

A need also exists to provide digital video terminal devices that enable different video information providers to present their respective video services in an organized, structured format adapted for ease of use by the user.

DISCLOSURE OF THE INVENTION

The present invention addresses the above noted needs by providing methods and terminal device structures for dynamically programming the digital audio/video terminal. The terminal can be reprogrammed on an as-needed basis to provide a wide range of services and associated terminal functionalities.

The present invention provides an information distribution system adapted to receive compressed, digital audio/video program information from at least one video information provider. According to the present invention, the information distribution system comprises a communication network transporting broadcast digital broadband channels of the audio/video program information, whereby the communication network cyclically broadcasts on one of the broadband channels at least one software control signal corresponding to video information provider. The cyclically broadcast software control signal identifies the audio/video information of the video information provider to a digital entertainment terminal receiving the digital broadband channels.

In one aspect, the invention is a digital entertainment terminal. The inventive terminal includes a network interface module. This module couples the terminal to a communication network for receiving a broadcast digital broadband channel and may provide two-way control signaling communication between the terminal and the network. The terminal also includes a control processor with a program memory. The control processor controls operations of the terminal. The terminal can be programmed to scan broadcast channels for a software control signal that identifies available video information providers (VIPs). The terminal may be programmed to download channel map data that identifies broadcast VIPs available on the network platform, as well as services provided by the respective VIPs. The program memory stores the software control signals received over an identified provider's broadcast channel as software executable by the control processor. The terminal further includes means for receiving inputs from a user and providing corresponding signals to the control processor, and an audio/video processor. The audio/video processor decompresses compressed, digital information received over the broadband channel for producing signals for driving an audio/video display device. The control processor executes the software received and stored in the memory to control subsequent operations of the terminal, for example navigation through broadcast program channels offered by the identified provider.

In another aspect of the present invention, the digital entertainment terminal is dynamically programmed by a digital communication link established between the digital entertainment terminal and the digital broadband network. The terminal receives software executable by the control processor from the network via the digital communication link. The digital communication link may be established by a downstream, broadband channel or an out of band signaling channel. The received software is stored in a memory within the digital entertainment terminal. During subsequent reception of digitized audio and video information over the downstream, broadband, digital communication link, the control processor retrieves the software from the memory. The processor executes the software to control interactions between the user and selected service providers and to produce audio/video information outputs to the user responsive to the received digitized audio and video information.

The software downloaded and stored in the terminal may include an application program for providing the user a navigation program to access an available information service provider. Applications programs can take an almost infinite variety of forms to facilitate different services. For example, the applications programs can control the formatting of different types of graphic displays overlaid on video programming for different services and can specify different definitions for input keypad functions. The applications programs can specify security procedures and/or enable operation of associated peripheral devices such as credit card readers.

Thus, the downloading of the application program software has a number of advantages. First, the DET can have a totally different program for different service applications offered through different information service providers. Alternatively, one provider can download applications software for one or more services and subsequently write over all or part of that software to permit a user to access another service, all during an ongoing session with the user. Also, any given provider can change their associated application programming at the source, without having to somehow modify or manually reprogram each DET. Another advantage is that the downloading feature eliminates the need for a large permanent non-volatile memory to store the application program in the DET.

A particular aspect of the information distribution system is that the network uses one or more broadcast channels to continually broadcast software control signals, i.e., signals carrying one or more service application control programs for one or more services offered by one of the information service provider systems. In other words, the network enables a user's DET to continually receive updated software code or data to optimize access to selected VIP services by the DET via the broadband communications network. A digital broadcast channel cyclically broadcasts software code or data from a video source (e.g., VIP or the network provider), so that a user's DET may access and download the broadcast code or data at a random time. For example, the broadcast channel may transmit application software for a navigation system (e.g., electronic TV Guide program such as Star Sights™), enabling a user to access one of the provider's services from a menu generated by the navigation system.

Alternatively, a broadcast channel may continuously transmit at least one tag stream corresponding to a VIP; thus, a user's DET can identify the available VIP's by scanning the broadcast channels and detecting the tag steams for each of the available VIPs. The user's DET identifies a VIP service using the corresponding tag data, thereby minimizing the amount of memory necessary in the DET for processing. In addition, the user's DET may include a memory that stores a channel map generated from scanning the broadcast channels during turn-on to identify those channels that serve as control channels for VIPs, i.e., that transmit the respective tag and application data. The use of the channel map is particularly effective for optimizing access speed during channel selection (i.e., "channel surfing"). In addition, the broadcast channels that continuously transmit the tag streams for corresponding VIPs (also referred to herein as "control channels") can be monitored regularly to determine if the VIPs are reassigned to a second or third channel, for example due to traffic overload or channel/equipment failure. Thus, a user's DET is able to immediately identify the available VIPs, with changes in broadcast channel allocation being transparent to the user.

According to a particular aspect of the present invention, the terminal receives and stores channel maps that provide ease of user access while enabling efficient broadcast channel management by the digital broadband network. The channel maps comprise a first map preferably stored in the terminal's nonvolatile memory that lists broadcast VIPs available on the network and the corresponding control channel data. The channel maps also comprise at least one secondary map, preferably stored in volatile memory, that provides a program guide of a corresponding VIP listing available services, as well as corresponding control channel information. The terminal downloads the secondary table, also referred to as data carousel, when the terminal accesses the control channel of the corresponding VIP. Each VIP compiles and supplies its own data carousel to the network; as a result, each VIP is able to present customized program guides that include services broadcast on popular broadcast channels, with logical channel assignments being invisible to the user.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

With the present invention the DET receives and stores downloaded control software. The DET can establish a link to the network via a level 1 gateway session to receive operation systems code, default channel maps, and permissions tables in order to receive broadcast services from multiple VIPs. In some cases, the DET may also establish a point to point link to a VIP's interactive equipment. For broadcast services, the DET captures a cyclically broadcast application. These software downloading features are discussed in more detail below in the context of preferred DET and network implementations.

Figure 1:
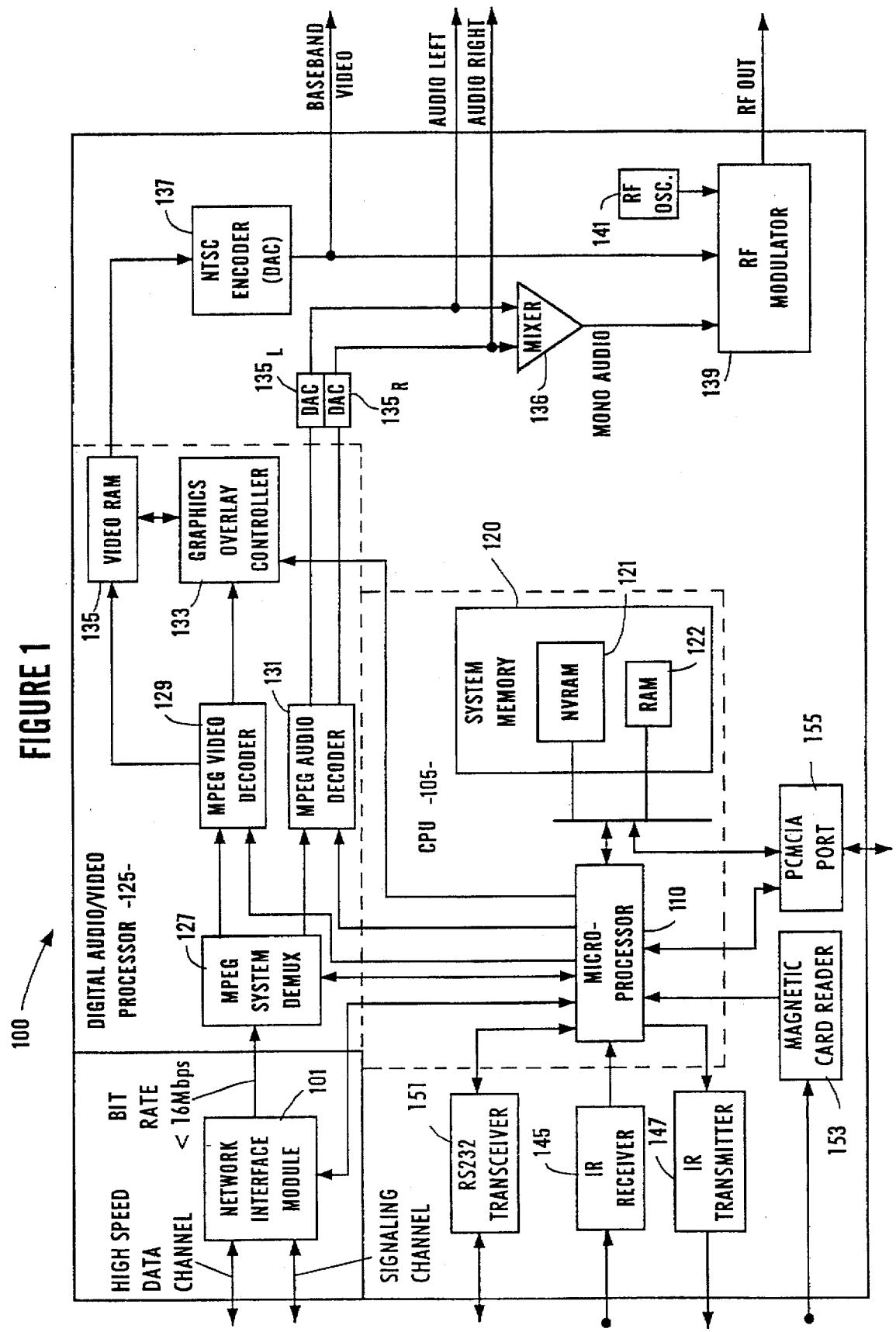
FIG. 1 illustrates a digital entertainment terminal in accord with the present invention.

The DET 100 shown in FIG. 1 will connect to a number of different types of networks, such as a Video Dial Tone network, video distribution networks as disclosed in commonly assigned application Ser. No. 08/250,791, filed May 27, 1994, entitled "Full Service Network" (attorney docket no. 680-080), the disclosure of which is incorporated herein entirely by reference.

In each network embodiment, the digital entertainment terminal (DET) of the present invention will include decoding circuitry for receiving and converting compressed, digitized audio/video signals into analog signals capable of driving conventional audio/video output devices, typically a standard television receiver. Although other decoders may be used, such as a DIGICIPHER™ decoder, the preferred embodiments of the DET will receive and process MPEG encoded information.

MPEG (moving picture experts group) is a broad generic standard for digital video program compression. A number of specific compression algorithms will satisfy MPEG requirements. MPEG-2 is a second generation compression standard capable of encoding video program material into a 6 Mbits/sec bit stream and packetizing a number of 6 Mbits/sec channel streams into a single higher rate signal transport stream. MPEG is a bi-directional predictive coding compression system, coded in accordance with discrete cosine transformation (DCT) processing. Picture elements are converted from spacial information into frequency domain information to be processed. Compression is begun by discarding information to which eyes are insensitive.

From the remaining information, an actual video reference frame, or I frame, is periodically used. The number of frames to be coded for each such I frame is set in the MPEG syntax, e.g., one reference frame for each fifteen frames, or every half second. A prediction is made of the composition of a video frame, termed a P frame, to be located a specific number of frames forward and before the next reference frame, the specific number also set in the MPEG syntax. Information from previous frames as well as later frames is used in formulating the prediction. "Delta" information is developed for coding the frames, called B frames between the actual and predicted frames, also by looking at frames in both directions. Rather than updating a whole frame, only the changed (or delta) information is provided for the delta frames. Thus the total information coded, and then transmitted, is considerably less than required to supply the actual information in the total number of frames. Typically, between I frames is a succession of two B frames followed by one P frame.

On decompression, the decoder in sequence uses the reference frame to form the prediction frames, these frames being used to construct the delta frames. Data is thus decoded in an order different from the order in which frames are viewed. Decoding must be several frames ahead of the frame currently shown on video.

The MPEG-2 standard also provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage PES packets made up of elementary streams that form a program share a common time base. The transport stream is designed for use in environments where errors are likely, such as storage or transmission via a noisy media. Transport stream packets are 188 bytes in length. Transport stream packets generally consist of two sections, a header section and a payload section. The header information includes, inter alia, a synchronization byte, transport scrambling control and a thirteen bit program identification (PID) number. PID value 0 is reserved as an indication that the packet includes program association table data. PID value 1 is reserved for identification of packets containing conditional access data, such as encryption information. PID value 0×1FFF is reserved for null packets utilized for synchronizing the link. The other program identification numbers are utilized to identify transport packets with the program source from which they originate.

A program association table (packet PID 0) maps each program source with the PID value associated with a program map related to that source. Thus, the program association table defines the packet location in the transport stream of a program map for each source of programming in the transport stream. The program map, in turn, specifies the PID values for packets continuing video, audio and/or data from the particular source. For example, the program map for CBS might be found in packets corresponding to PID 132; the program map for NBC might be found in packets identified by PID 87 and so forth. The program map for CBS in the packet with PID 132 would then identify the PID numbers for the actual packetized elementary streams (PES) for the video and audio channels associated with the CBS program.

One should note at this time that more than two PID's may be associated with programming from one source. For example, there could be a data channel associated with the program which would include data for closed captioning for the hearing impaired. There could be a number of audio elementary streams, for example, carrying respective different languages. Thus the programming map provides some flexibility beyond that required for merely associating a single video and audio elementary stream. A more detailed description of the program association table is found below with respect to FIG. 5.

Once the DET identifies and captures the programming map, the program decoder can extract the video elementary stream, the audio elementary stream(s) and any associated data stream for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

For each different type of network, the DET 100 (FIG. 1) will include a network interface module 101 providing the actual physical connection to the particular type of network. The network interface module 101 will also perform any format conversion necessary between signal. formats utilized by the network and signal formats used within the DET 100. For example, in the Full Service Network disclosed in the cited Ser. No. 08/250,791 application, the network interface module 101 will include means to demodulate received broadband data and convert ATM (Asynchronous Transport Mode) cell stream data into MPEG bit stream data for further processing. The network interface module 101 also provides two-way signal conversion and formatting for at least a control signalling channel. The network interface module 101 also temporarily stores data transmitted from the network during times when the DET 100 is in a standby state (i.e., supplied power, but CPU is in an off state).

In the illustrated embodiment, the network interface module 101 presents two connections to the rest of the DET, a high bit rate broadband connection and a low bit rate signaling connection. The broadband connection is a one-way downstream only connection, but the low-bit rate signaling connection is a two-way connection. For example, the network interface module would include means to multiplex and demultiplex signals for transmission/reception over a coaxial cable or optical fiber. The network interface module would also include the means to physically connect to the particular network. For example, in a fiber to the home network, the module would include a means for two-way conversion between electrical and optical signals and connections to one or more optical fibers for the necessary two-way transmission. However, the network interface module might be modified for a non-physical communication link, for example, via satellite-to-antenna, especially in rural areas.

The network interface module 101 takes the form of a plug in module. In one embodiment, the module 101 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 100 includes a CPU 105, comprising a 386 or 486-type microprocessor 110 and associated system memory 120. The system memory 120 includes at least 2 mbytes of volatile dynamic RAM 122 and 1 mbyte of non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the network interface module 101 and routes the packets to the appropriate components of the DET. For example, the MPEG system demultiplexer 127 circuitry recognizes audio and video packets in the MPEG data stream and routes those packets to the decoders 129, 131, respectively.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

Under certain circumstances, the video RAM 135 also serves to freeze video frames. For example, when a video transmission ends for some reason, the RAM 135 will contain the video and associated graphics information for the frame last received and displayed. The DET can continue to output this frame as a still video output signal for some period of time.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user, and under at least some circumstances, transmit appropriate data signals over a narrowband channel through the particular video network. For example, the DET 100 may send and receive control data through a 16 kbit/s channel on the subscriber's loop of a Video Dial Tone network, whereby the network includes an X.25 type packet network for transport of the control signaling data.

In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on the downloaded applications programming and/or operating system software stored in the system memory 120. In response to the input commands, the microprocessor 110 controls cursor position and alphanumeric information displayed as graphics and text on the associated television set. The microprocessor 110 will also respond to an appropriate input command from the user to formulate a message for upstream transmission though the network interface module 101 and the signaling channel of the particular connected network.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

Figure 2:
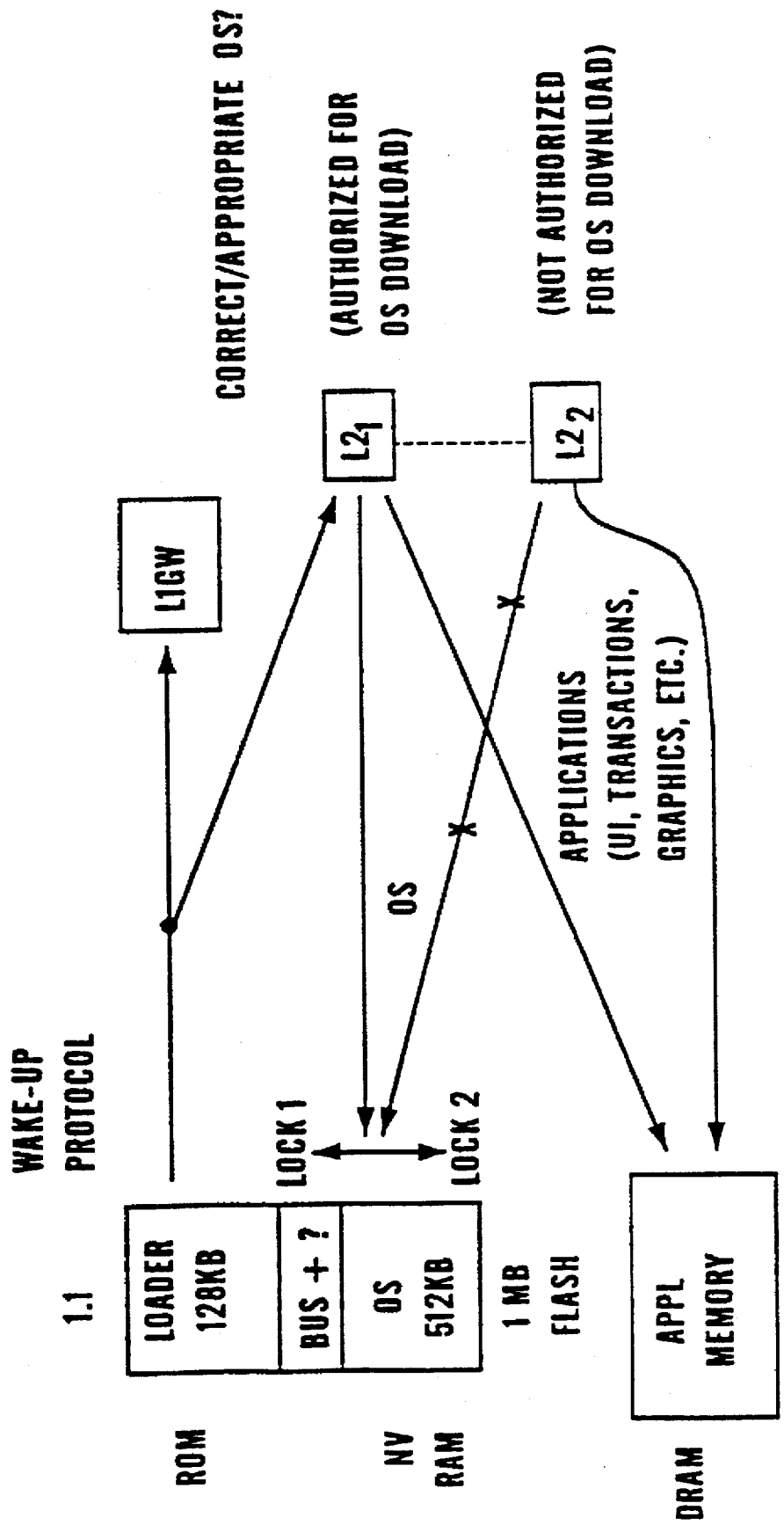
FIG. 2 shows a system memory layout for the digital entertainment terminal and an associated diagram of functions involved in memory management and software downloading in accord with the present invention.

FIG. 2 shows two separately mapped segments of memory, a non-volatile portion and a volatile portion. The non-volatile portion of the memory may consist of the ROM within the microprocessor (typically 128 kbytes) and the non-volatile RAM (minimum 512 kbytes to 1 mbyte) as discussed above. Alternatively, the entire non-volatile portion of the memory may consist of 1 mbyte of flash memory. The volatile portion of the memory consists 2 mbytes of DRAM.

The ROM (or corresponding segment of flash memory) stores a loader program for controlling many of the wake up functions of the CPU 105. The loader program is analogous to a BIOS (basic input/output system) in a PC. The loader program provides initial instructions to the microprocessor 110 to carry out a series of hardware diagnostics during an initial boot routine. If faults are detected, the loader routine will cause display of error codes and instructions on the associated television screen. For example, if the loader routine results in detection of a network error, the DET might generate a display instructing the subscriber to call a telephone number assigned to the network service company together with a four digit code indicating the type of network fault, e.g. lack of a signaling channel or lack of a broadband channel. Alternatively, if faults in the DET are detected, the display would instruct the subscriber to call a telephone number assigned to the DET vendor together with a four digit code indicating the type of DET equipment fault, e.g. operating system memory error.

In the presently preferred embodiment, the loader routine also provides sufficient programming to scan broadcast channels for VIP tag data, access a level 1 gateway, L1GW in FIG. 2, and subsequently access a level 2 gateway (L2). For example, in the current implementations, the loader program includes sufficient software to permit signaling communications through the particular type of network interface module and network the DET connects to. As will be explained in more detail below, the communications protocol software could be stored on memory carried in the network interface module, and the loader program would retrieve that software from the interface module memory during initial boot-up.

If necessary, the section of non-volatile memory storing the operating system is accessible to updating by a VIP with a level 2 gateway and associated server, only if the loader routine identifies the particular level 2 as one authorized to access the DET operating system. Typically, one of the VIP's will sell the DET to the subscriber. Although the subscriber can access other VIP's services using the DET and receive other VIP's applications software through a point to point session or a broadcast channel, only the level 2 gateways of the VIP selling the DET and/or a level 2 gateway operated by the manufacturer can update the operating system. The loader routine therefore identifies the level 2 gateways operated by or in cooperation with the VIP who sold the DET and the DET manufacturer. FIG. 2 shows a first level 2 gateway $L2_1$ authorized to rewrite the operating system. The second level 2 gateway $L2_2$ is not authorized to rewrite the operating system, as indicated by the X's across the arrow between that level 2 ($L2_2$) and the operating system (OS). The loader program therefore provides sufficient information to identify whether an accessed level 2 gateway is one authorized to rewrite the operating system portion of the non-volatile memory.

If flash memory is used for the loader program storage and operating system storage, then access to the different programs is limited by different types of flash memory "locks". The portion of the flash memory storing the loader routine typically would be protected by a hardware lock, e.g. burned out write pin on the chip, so that no one can access and change the loader routine. The lock on the remainder of the flash memory would be a software lock. If the DET accesses a VIP not identified in the loader routine, the lock would remain at the level illustrated by "lock 2" to protect all of the remainder of the non-volatile memory region against any input or overwriting of the stored operating system code. If the DET recognizes access to a VIP's level 2 gateway authorized to reprogram the operating system, the lock level would shift to "lock 1" in FIG. 2.

The precise level of "lock 1" may vary. For a level 2 gateway of the VIP who sold the DET, the gateway might be granted access to all of the rewriteable portion of the non-volatile memory, including any proprietary portion identified as "BVS" in the drawing. Some other VIP might be granted access to rewrite a portion of the operating system (OS) but not the proprietary portion. Also, control of the level of the lock 1 could ultimately be used to allow certain level 2 gateways access to the loader routine as well.

When a point to point interactive session is first set up, the DET transmits an initial message identifying itself and identifying the current versions of various modules of the operating system it is running. The level 2 gateway examines the operating system module information and determines whether each module corresponds to the version necessary to run the particular VIP's application programs. For example, if the application programs call for version 1.1 of the graphics driver, those applications may not run properly on a DET still using version 1.0 of that module of the operating system. The identification of the operating system modules therefore permits the level 2 gateway to determine if the DET is running operating system modules compatible with the VIP's programs. If the loader program identifies the level 2 gateway as a gateway authorized to rewrite the operating system software, and the level 2 gateway identifies one or more modules of the operating system needing to be changed to an earlier or later version thereof to achieve compatibility with the VIP's applications, the level 2 gateway will transmit an operating system rewrite code through the signaling portion of the network to the microprocessor 110. Subsequent data received over the broadband channel is routed to the microprocessor 110 and used to rewrite appropriate portions of the operating system.

For a selected VIP's level 2 gateway without access to the operating system but requiring one or more software module versions not currently resident in the DET system non-volatile memory, that level 2 gateway would instruct the DET to access a neutral third party level 2 gateway and server, typically operated by the DET manufacturer, to obtain the module(s) needed for compatibility with the selected VIP's service applications. The DET would access the third party level 2 gateway and server, obtain the requisite operating system modules, and then initiate another session with the selected VIP's level 2 gateway and server.

In the memory management illustration of FIG. 2, any L2 level 2 gateway and associated server can download application program software to the DRAM application memory in the DET. The DET will also receive and load software applications through one or more broadcast channels. The downloaded applications software controls a wide variety of DET functions in accord with each VIP's services. For example, this software may specify the functionality of the user interface (UI), navigation through broadcast channels, types of transactions to be performed, graphics styles, etc. A key feature of the present invention is that at least some of the software/data downloaded through a broadcast channel controls "channel mapping" functions of the DET, to permit an end user to easily navigate through the channels carrying the services of each broadcast VIP. Once all necessary software resides in memory in the DET, the user begins interaction with the services offered by the particular service provider or VIP.

The downloaded software from one service provider or VIP might present menus and prompts in simple text form. Another provider, however, might choose to present menus and prompts in a much more graphical form approaching virtual reality. Graphics and a small number of frames of video can be downloaded and stored with the application software. Although the precise presentation to the user displayed on the television set is determined by the software downloaded by the service provider and stored in the DET's system memory, a preferred implementation for broadcast services is discussed below with reference to FIG. 5.

The DET 100 of the present invention may also include a number of additional interface devices. In the example illustrated in FIG. 1, the DET 100 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 151 connected to the microprocessor 110. An RS-232 port is a standardized two-way serial data interface typically used for connecting computers to peripheral devices, such as modems. In the present system, the RS-232 transceiver 151 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 151 would be controlled by the operating system and applications program software downloaded into the system memory 120.

FIG. 1 also shows the DET 100 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan their own credit card through the magnetic card reader 153 as part of the payment operations. The reader could also have magnetic write capabilities to perform debit card operations.

The illustrated DET 100 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 100 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability.

In the current implementation, the PCMCIA port 155 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 151, the data rate through the PCM-CIA port 155 is much higher.

Figure 3:
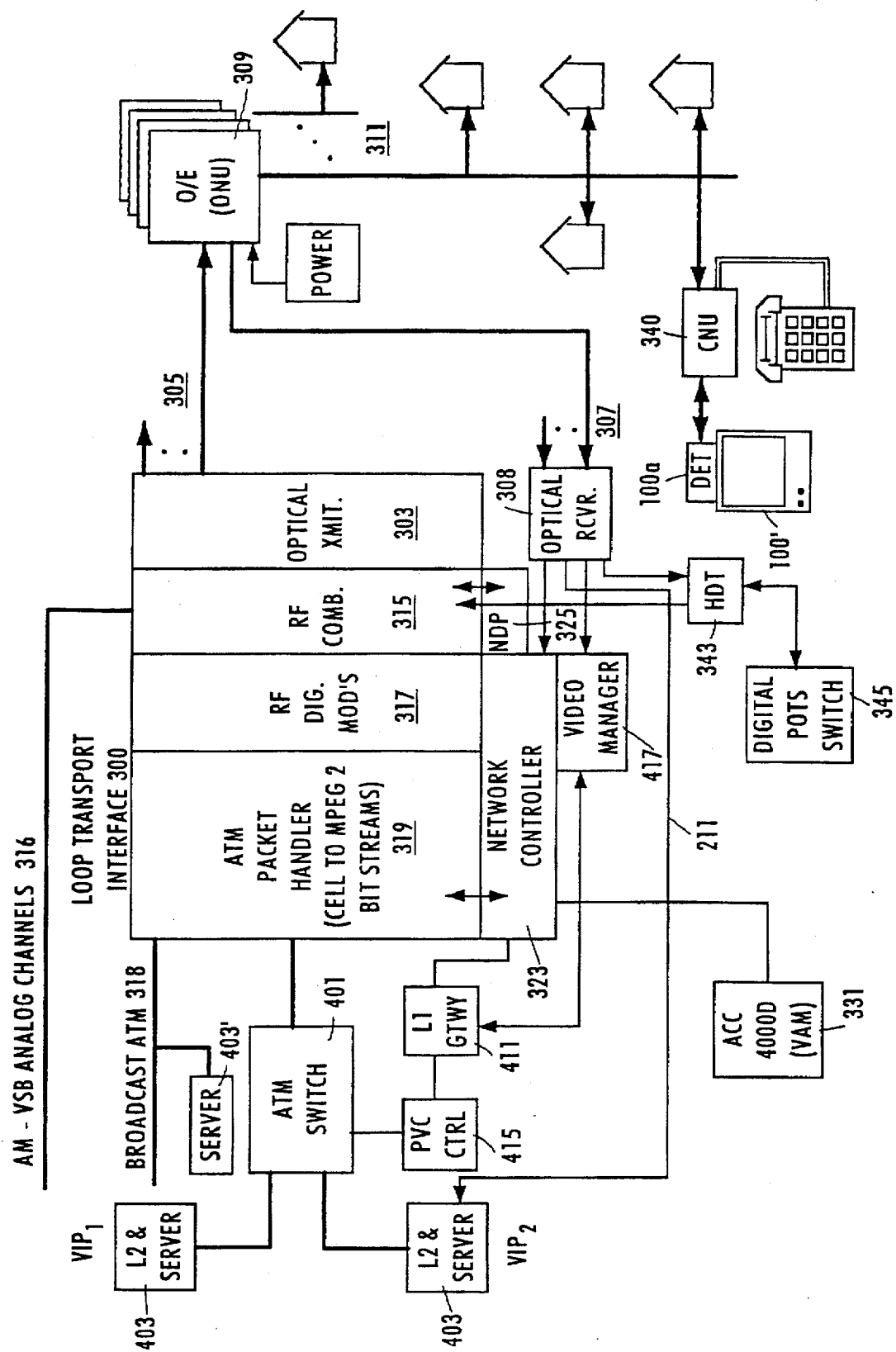
FIG. 3 illustrates one exemplary network configuration utilizing the terminal to provide an array of broadcast and interactive services.

FIG. 3 is a block diagram of a first example of a broadband network for providing interactive services, such as video on demand, home shopping or purchasing, home banking, medical information, ticket ordering, gaming, etc. In accordance with the present invention, the broadband network selects certain broadcast channels as VIP control channels to continuously transmit software control signals that allow any user to randomly identify and select available VIP services. The software control signals may include navigation software which includes instructions for controlling selection of video services and a program or channel map for identifying the RF channel and the PID values for video, audio, or data packets for each program service. The program map information at least facilitates rapid channel changes (channel surfing) through the VIP's broadcast services, using channel identifiers arbitrarily selected by the VIP, for convenience and/or ease due to user acceptance.

Such navigation software, when loaded by the DET, may also be implement as a menu program operating as an electronic TV Guide that is recalled each time the user presses a predetermined button, for example "GUIDE", on the remote control. In this example, the first time a user presses the "GUIDE" button on a remote control after turning on the DET, the DET jumps to the control channel broadcasting the navigation software for the network or for a predetermined VIP. From that channel, the DET captures and executes the navigation program in real-time. Thus, real-time execution minimizes the amount of memory necessary for the DET; in addition, there is no need to establish a level 1 or level 2 gateway session to download software, thereby minimizing network traffic. Alternately, the DET may initially download a portion of the software (e.g. the executable code) during turn-on, and access menu data from the control channel when the user presses "GUIDE"; this variation will result in an increase in the execution speed of the navigation software. In another variation, the DET may download software and data during turn-on, and subsequently download only update data.

Video information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more 0C-3 links) from their respective video server to each Access DCS within the LATA.

In networks having broadcast services, such as shown in FIG. 3 and/or as disclosed in the above cited Full Service Network application Ser. No. 08/250,791, at turn-on, the DET enters a mode for reception of the broadcast service. In such a case, the non-volatile memory in the DET stores operating system software including instructions for controlling selection of the broadcast services and a primary channel map for identifying control channels of VIPs that are available on the network. The non-volatile memory may be loaded at the factory, or by a level 1 session with the network during registration of the DET. If interactivity with a particular VIP is desired, the level 1 gateway would be accessed in response to a user operating an appropriate button on the remote control, after which the user would select a VIP, and the DET would interact with the VIP's level 2 gateway and file server to obtain applications software programming and/or operating system changes, as discussed in more detail in the commonly-assigned application Ser. No. 08/250,791, the disclosure of which is incorporated by reference.

Alternatively, in networks carrying broadcast services, the DET would turn-on with a loader program that executes a mode for scanning the broadcast channels for tag data for corresponding VIP's. Once scanning is complete, the DET will have compiled a primary channel map including the information necessary to access one of the available VIP services. The stored program/channel mapping tables permit users to select channels with a standard channel number even though the program may be carried on an unrelated channel within the network. For example, one broadcast provider might carry the local NBC station on channel 17, another broadcast provider might carry that station on channel 77, and the local over the air broadcast would be on standard RF TV channel 4. If the user selected the first provider, the mapping table would indicate that broadcast channel 4 is carried on network channel 17. If the user selected the second provider, the mapping table would indicate that broadcast channel 4 is carried on network channel 77. In either case, the user would select the channel simply by inputting the number 4. The subscriber does not need to know which network channel each VIP uses for that broadcast service.

Although prior systems allowed the same DET to be used in a variety of different networks only with a substitution of a different network interface module to adapt the DET to each particular network, a user's DET can be fully compatible with any network that broadcasts VIP tag data in accordance with the present invention, regardless of the content of a particular broadcast channel. Similar to the network disclosed in the Full Service Network application Ser. No. 08/250,791 cited above, the present invention may utilize ATM switching to transport MPEG streams.

Asynchronous transfer mode or "ATM" switching is an advanced, high-speed packet switching technology. MPEG (motion picture experts group) is a broad generic standard for video program compression, and MPEG 2 is a second generation compression standard for encoding each video program signal into a 6 Mbit/s bit stream. In ATM based networks, the MPEG 2 bit streams are converted into cellular payload data, and cell headers are added. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand or for transmission of downloaded application programming software, the VCI/VPI in each header of the ATM cells would effectively identify specific end points of the virtual communication link. The identification of the receiving end of such a point to point link effectively addresses the ATM cells to the particular DET. In a network using such cell transmission the loader program would instruct the DET to process VCI/VPI information, e.g. to recognize the terminal's own ATM destination address in the incoming cell stream.

Other networks carrying both broadband and interactive services require alternate forms of address processing within the DET. FIG. 3 depicts an implementation of a Full Service Network utilizing a DET in accordance with the present invention. The network of FIG. 3 is a hybrid fiber-coax system which provides RF transport of both analog and digital broadband services. The illustrated network provides broadcast video distribution, archival video services and interactive multi-media services as well as plain old telephone service.

Within an area containing a large number of subscribers, such as a LATA, a telco deploys a number of Loop Transport Interfaces 300, only one of which appears in the drawing (FIG. 3). At least as currently envisaged, each Loop Transport interface 300 will be located in a telco central office. In an area serviced through multiple central offices, several different central offices would each have a Loop Transport Interface similar in structure to the Interface 300 depicted in FIG. 3. In some respects, each Loop Transport Interface will serve as the headend of an otherwise conventional optical fiber trunk and coaxial cable type CATV distribution network.

In the Loop Transport Interface 300, a laser type optical transmitter 303 transmits downstream signals through fibers 305 to optical to electrical nodes referred to as "optical network units" or ONU's. The laser operates in a linear mode in the range of 5–750 MHz. The transmitter has an optical splitter and can transmit to several ONU nodes 309. Each ONU 309 performs optical to electrical conversion on the downstream signals and supplies downstream RF electrical signals to a coaxial cable distribution system 311.

The optical transmitter receives and transmits signals from an RF (radio frequency) combiner 315. The combiner 315 combines and levelizes RF signals from several sources to produce the appropriate signal spectrum for driving the optical transmitter 303. One set of signals 315 supplied to the RF combiner will be group of AM-VSB (amplitude modulated vestigial sideband) analog television signals from one or more appropriate sources not separately shown. Such signals are essentially "in-the-clear" CATV type broadcast signals capable of reception by any subscriber's cable ready television set.

The analog television signals are broadcast from the optical transmitter 303 through the tree and branch optical and coax distribution network to provide "basic" CATV type service to all subscribers on the network. For subscribers choosing only analog television service who do not have a cable ready television, the Network operating company offers a standard CATV type analog frequency converter, or the subscriber could choose to purchase a converter on the open market. The network interface module in the DET 100a will also include a tuner that permits subscribers to the digital services to receive the analog broadcast channels through the same equipment used for the digital services.

The network depicted in FIG. 3 also provides transport for digitized and compressed audio/video programming, both for certain broadcast services and for interactive services, such as video on demand. Such programming will be encoded and compressed in MPEG-2 format. As discussed in more detail below, the present invention permits specific use of MPEG encoded materials to offer a variety of interactive services without continuously utilizing a full MPEG encoded broadband channel to transport information to the subscriber's DET 100'.

In the illustrated network, the MPEG encoded video is transported to each Loop Transport Interface using asynchronous transfer mode (ATM) transport and switching. Asynchronous transfer mode (ATM) is a packet oriented time division multiplexing technique. In ATM, information is organized into cells having a fixed length and format. Each cell includes a header, primarily for identifying cells relating to the same virtual connection, and an information field or "payload". In one proposal, a 53 octet ATM cell would include a cell header consisting of 5 octets and a payload consisting of 48 octets of data. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand, the VCI/VPI in each header of the ATM cells would effectively identify a specific end point of the virtual communication link.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. Typically, however, the ATM cells ride in synchronous slots on a high-speed time division multiplexed media, such as a SONET optical fiber.

ATM allows any arbitrary information transfer rate up to the maximum supported by the ATM network, simply by transmitting cells more often as more bandwidth is needed. In the presently preferred implementation of the Full Service Network of FIG. 3, all digitized video materials will be transferred at a constant, standardized bit rate, however, ATM permits the network to carry digitized video information over channels of different bit rates, e.g. 1.5 Mbits/sec, 3 Mbits/sec, 6 Mbits/sec, etc. It also is possible to vary the bit rate during communication on an as needed basis.

In the illustrated network, digital broadcast service signals 318 in MPEG encoded form and arranged in ATM cell packets are applied to an ATM packet handler 319 in the Loop Transport interface 300. The ATM broadcast services will carry premium service type programming. The ATM broadcast signals may originate from any appropriate source, as illustrated in FIG. 3 of co-pending application Ser. No. 08/304,174 filed Sep. 12, 1994, entitled "LEVEL 1 GATEWAY FOR VIDEO DIAL TONE NETWORKS", Attorney Docket No. 680-093, having the same common assignee as the subject application, the disclosure of which is incorporated herein by reference.

The ATM packet handler 319 also receives MPEG-2 encoded streams from a server 403', which provides navigation software code and/or data. Specifically, to provide the broadcast application downloading including program mapping software, each VIP will operate a software server 403'. Typically, the server 403' is a personal computer or the like which compiles the applications code and data for transmission. For a program guide application, for example, the computer would receive TV guide type program data from a guide service, such as Star Sight, over a relatively low speed communication line. The computer would buffer the data and pare the data down to precisely that needed for the specific channels broadcast by this VIP over the particular local network. The computer memory stores the executable portion of the program guide application software. The computer would combine the pared data with the executable code, program channel mapping data and any other relevant data developed by VIP, e.g. MPEG frame rates for different channels as a function of time. The combined code and data would then be encoded for transmission.

In the preferred implementation targeted, the computer would include an MPEG-2 transport stream encoder, although other network implementations could use other forms of digital data encoding and transmission. In the MPEG implementation, the encoder would packetize the code and data in 188 byte packets, in accord with the MPEG-2 standard. Each such packet consists of a 4 byte header section, an optional adaptation field and a payload section. For a given application, the header of all packets for that application would include the same packet identifier (PID). Packets for a different application would all have a second PID value. The header would also include a stream descriptor to identify the payload as user data for routing to the CPU within the DET (as opposed to routing to the MPEG audio or video decoder elements). The header would further identify the payload as either executable code or as data. In the network of FIG. 3, the computer would also include an ATM interworking unit to reformat the MPEG packets into ATM cells for transmission to the loop interface 300.

The network may reserve certain RF channels for predetermined services. In such a case, the server 403' is coupled to the video manager 417 which determines RF channel assignments and PID values for the VIPs (described in detail below).

For broadcast channels that are used as VIP control channels to continuously transmit executable code and data for corresponding VIPs, the Network will periodically transmit in MPEG format a transport stream packet having a user data adaptation field within the payload field. The reception of the user data adaptation field by the DET signifies to the DET that unique control data has been received. The user data adaptation field includes an information provider's directory declaration that serves as a "tag" that identifies a specific video information provider, such as BVS, SpectraVision, etc., or a "local" cable provider. The payload field will also include decoding information and information used in accessing the VIP by broadcast channel and PID number. In addition, the payload field may include broadcast channel and PID number data for a "backup" control channel in the event that reallocation is necessary.

Fully interactive broadband digital signals, in MPEG-ATM format, are also applied to the ATM packet handler from an ATM switch 401. The ATM packet handler 319 terminates all ATM cell transport through the Network. This handler receives the ATM cell streams and converts the cell payload information into MPEG 2 bit streams.

In addition to the analog broadcast signals, the RF combiner 315 which prepares signals for downstream transmission by the optical transmitter 303 receives a variety of other analog RF signals from a group of RF digital modulators. The RF analog outputs from the modulators carry digital broadband information. The content for the digital RF modulators comes from the ATM packet handler 319. A network controller 323 and an associated network data processor (NDP) 325 use the VCI/VPI header from the ATM cells to control the ATM packet handler 319 to route the MPEG bit streams to the appropriate ones of the digital RF modulators 317.

U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network. The currently preferred implementation uses 64 QAM (quadrature amplitude modulation) or 16 VSB (vestigial sideband) modulation techniques in the RF modulators 317 in the Loop Transport Interface 300. Using 64 QAM, 4 channels of 6 Mbits/s MPEG encoded digital video information can be modulated into one 6 MHz bandwidth analog channel. Similarly, 16 VSB yields 6 channels of 6 Mbits/s MPEG encoded digital video information modulated into one 6 MHz bandwidth analog channel. Each RF modulator produces a 6 MHz bandwidth output at a different carrier frequency.

The 6 MHz bandwidth RF signals from the modulators 317 are supplied to the optical transmitter 303 for downstream transmission together in a combined spectrum with the AM-VSB analog television signals 316. The downstream transport of the digital programming is an RF transmission exactly the same as for the analog basic service channels, but each of the channels from the RF modulators 317 contains 4 or 6 digitized and compressed video program channels, referred to hereinafter as "slots". The 6 Mhz digital program channels will be carried through the fiber and coaxial system in standard CATV channels not used by the analog basic service programming. The ONU 309 is essentially transparent to both the analog basic service channels and the channels carrying the digital programming and supplies all of the signals as a combined broadcast over the coaxial cable network 311. The optical fiber 305 from the transmitter, the ONU's 309 and the coaxial distribution systems 311 therefore provide a broadcast network transporting all downstream programming to all subscriber premises serviced thereby.

Figure 4:
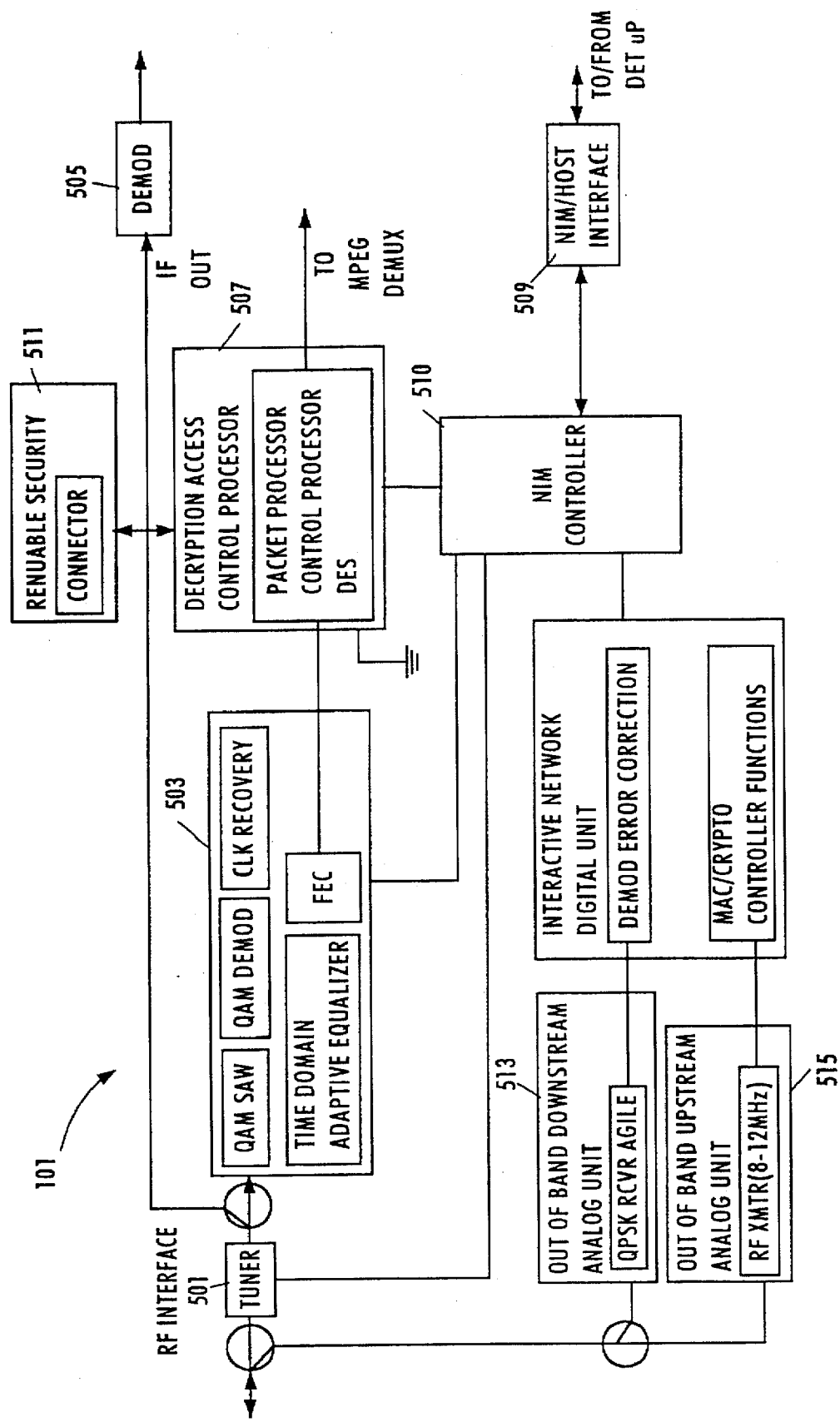
FIG. 4 is a block diagram of the network interface module (NIM) used to interface the digital entertainment terminal to the network of FIG. 3.

At the subscriber premises, a network interface module (NIM) couples the set-top device or digital entertainment terminal (DET) 100a to a drop cable of the coaxial distribution network 311. In this network configuration, the NIM includes an analog frequency tuner controlled by the microprocessor 100 (FIG. 1) to selectively receive the RF channel signals, including those channels carrying digital information. The NIM also includes a QPSK, QAM or VSB demodulator to demodulate a selected one of the digitized program signals carried in one of the digital slots within a received 6 MHz channel and will perform a forward error correction function on the demodulated data. The digital audio/video signal processor 125 within the DET decompresses received video signals, generates graphics display information and performs digital to analog conversion to produce output signals compatible with a conventional television set 100', exactly as in the earlier embodiments. As discussed in more detail below, FIG. 4 depicts an exemplary NIM 101 for use in the network of FIG. 3.

The analog tuner in the NIM will tune in all channel frequencies carried by the network, including those used for the analog broadcast services. The DET 100a includes a bypass switch or the like and an analog demodulator to selectively supply analog signals from the basic service channels directly to the audio/video output terminals or to the modulator, to provide signals to drive a standard television receiver. The DET 100a therefore can be used as a frequency converter for reception of the analog signals.

As mentioned earlier, each DET 100a includes a remote control and/or keypad to receive various selection signals from a user. At least in response to certain user inputs, such as selection of a pay per view event, the DET will relay data signals upstream over a signaling channel on the coaxial cable to the ONU 309. The actual transmission of any such data signals upstream from the DET 100a occurs in response to a polling of the DET by the ONU 309. The ONU 309 combines upstream data signals from the DET's serviced thereby and transmits those signals upstream over another optical fiber 307 to an optical receiver 308 in the Loop Transport interface 300. Each DET 100a may transmit data on a different carrier frequency, in which case the network controller knows which DET sent particular data based on the received frequency channel. Alternatively, for interactive services, the DET may transmit a unique identification code with the upstream message. The presently preferred embodiment for upstream signal transmission will be discussed in more detail with respect to the NIM of FIG. 4.

Certain digital program signals carried on the network may be encrypted using encryption technology and key codes. The network includes an ACC 4000D 331 that downloads decryption keys to the NIM in the DET for the channels the subscriber is permitted to receive. Details of specific encryption algorithms, the key codes and the precise techniques for downloading the key codes to the DET's are well known to those skilled in the art and familiar with the relevant patents and literature.

In the implementation of the network illustrated in FIG. 3, a Video Manager 417 performs specific program access control in the access subnetwork, and the level 1 gateway 411 controls the network functions available to the DET. In particular, service profiles for each customer on the Network and their DET's are set up by the level 1 gateway 411 and stored within the Video Manager 417. For example, the level 1 gateway 411 downloads default channel maps, permissions tables, and data to enable a newly registered DET to access the available broadcast VIP's. The Video Manager 417 periodically polls to identify NIMs that are active or off-line, and instructs the ACC 4000D to download updated decryption keys. The level 1 gateway 411 also provides an interface to appropriate billing systems (not shown). Thus, the level 1 gateway is responsible for downloading connection block descriptors (including RF channel and PID values) to the DET. The video manager 417 controls the RF assignments in the modulators 317 for the access subnetwork. Finally, the ACC 4000D is responsible for downloading encryption keys to the DET in response to an instruction from the video manager.

For ATM broadcast services, when a subscriber first signs up, a portfolio of channels subscribed to by that customer is established in the subscriber's profile data by the level 1 gateway 411. Based on this profile data, for example, the level 1 gateway 411 may download a service map into the subscriber's DET 100a, also referred to herein as primary channel map, that identifies broadcast channels that include control channel information for VIP services in accordance with the channel assignments set by the video manager 417. The downstream transmission portion of the network provides an out-of-band downstream signalling channel to the DET's, for example for the downloading of the service map information from the level 1 gateway 411 to each DET 100a. As discussed in more detail later, this downstream signaling channel also carries signals for controlling software downloading and/or selection of certain channels for decoding in interactive services.

In another implementation, the default channel map downloaded by the level 1 gateway would not include the control channel information for particular VIPs; rather, the user would request a level 1 gateway session in order to receive the connection block descripers for the control channel of a selected VIP.

All digital broadcast service signals are broadcast into each subscriber's premises, and each DET 100a includes means for receiving and decoding each such digital broadcast service channel, as discussed above with regard to FIG. 1. The microprocessor in the DET 100a controls access to any of these channels based on the downloaded map information stored in the system memory. For example, if one subscriber requests HBO, and that subscriber has paid to subscribe to HBO, the subscriber's DET 100a will contain map information instructing it to tune the RF channel and select and decode the digital program slot carrying HBO for display on the subscriber's television set 100'. However, if a requesting subscriber has not paid for HBO, the downloaded service map will not provide the requisite data for tuning, decoding and decrypting of that channel.

The illustrated network also offers pay per view services through the ATM broadcast program channels 318. A user selects a pay per view event by operating the DET 100a. When next polled by the ONU 309, the DET 100a transmits a purchase message upstream through the Loop Transport Interface 300 to the level 1 gateway 411. If the billing information and authorization data in the subscriber's profile stored in the level 1 gateway 411 indicate that the DET identification is valid and the subscriber is authorized to purchase such events, the level 1 gateway 411 downloads a connection block descripter to the DET and informs the Video Manager 417 that the DET is an authorized user. In response, the video manager 417 sends an authorization instruction for a decryption key to the ACC 4000D for the requesting subscriber's DET 100a. The DET 100a decodes the pay per view event in essentially the same manner as for other premium services carried on the ATM broadcast channels 318, as outlined above. The level 1 gateway 411 will upload the relevant purchase data and subscriber identification information to a billing processor or to the provider of a particular pay per view event, for billing purposes.

The illustrated implementation of the network also provides telephone service. Between the optical network unit and the subscriber premises, the 700–750 MHz portion of the spectrum on the coaxial cable will carry the telephone signals. This allocated spectrum provides transport for 24 DS0 telephone channels. Each subscriber premises will have telephone interface referred to as a Cable Network Unit (CNU) 340 coupled to the coaxial cable which serves to couple two-way signals between a twisted wire pair into the home and the telephone frequency channels on the coaxial cable 311.

Carrier frequencies used for telephone services may be individually assigned to particular subscriber's CNU's. Also, the telephone signal spectrum is carried on the same two fibers that carry the video and the upstream signalling between the Loop Transport Interface and the ONU. Upstream telephone signals are applied from the optical receiver 308 to a host digital terminal (HDT) 343 which provides an interface to a standard digital telephone switch 345. Downstream telephone signals from that switch pass through the HDT 343 to the RF combiner 315 for transmission in the 700–750 MHz frequency range over the fiber to the ONU 309 and the coaxial cable distribution system 311.

In an alternate implementation not shown, the Loop Transport Interface 300 would dynamically allocate the DS0 channels on the coaxial cable system 311 on a time-sharing basis, in essentially the same manner as in mobile radio systems. Two additional fibers and a second optical transmitter and receiver pair would carry the two-way telephone signals to and from the ONU 309. Because of the use of the separate optical links for telephone service in this alternate implementation the HDT and telephone switch need not be closely associated or collocated. with any particular one of the Loop Transport Interfaces.

Battery power for telephone service and for the various interfaces will be applied through the ONU's 309 and supplied downstream over the coaxial cable.

The implementation of the network illustrated in FIG. 3 also offers access to video information providers (VIP's) for interactive broadband services, such as video on demand. For archival services and many other interactive services, each VIP has a level 2 gateway and some form of broadband information file server 403. The ATM switch 401 provides communications links between the Loop Transport interfaces 300 and the level 2 gateways and file servers 403. Customer access to the VIP's is controlled through a level 1 gateway 411. A permanent virtual circuit (PVC) controller 415 and a video manager 417 respond to signals from the level 1 gateway to control the point to point routing through the Network. The PVC controller 415 stores data tables defining all possible virtual circuits through the ATM switch 401 and the Loop Transport Interface 300 serving each DET terminal of a customer subscribing to each particular provider's services. These data tables define the header information and the switch port to the packet handlers needed to route cells to the correct Loop Transport Interface. The video manager 417 stores similar data tables identifying the transmission fiber ports, RF channels and multiplexed digital channel slots which may be used to transport each data stream processed by the ATM packet handler 319 through the fiber 305 to the appropriate ONU 309 serving each DET. The data tables in the PVC controller 415 and the video manager 417 thus define "permanent virtual circuits" between the VIP's equipment 403 and the DET's 100a. Although not shown in FIG. 3, these data tables are supplied to the server 403' in the event that the server 403' provides network navigation software, as discussed above.

For a full, broadband interactive session, the subscriber operates the DET 100a to interact with the level 1 gateway and select a VIP. The PVC controller 415 responds to instructions from the level 1 gateway by activating the ATM switch 401 to establish a downstream virtual circuit path between a port of the VIP's server and the ATM packet handler within the Loop Transport Interface 300 servicing a subscriber requesting a call connection to the particular VIP. The PVC controller 415 provides the VPI/VCI address for the ATM stream, and the level 1 gateway 417 supplies the assigned VPI/VCI to the level 2 gateway and the video manager 417. The level 1 gateway also informs the video manager of the necessary bandwidth. The video manager 411 in turn assigns a particular one of the digitized video channel slots in a digital program type RF channel to carry the particular point to point communication. Specifically, the video manager controls the ATM packet handler 319 to route MPEG data recovered from the ATM cells for the particular point to point communication to the port for one of the RF modulators 317 so that the modulator will include the MPEG data in the assigned digital channel slot within a particular 6 MHz RF channel. The video manager 417 also transmits a signal downstream through the signaling channel to the subscriber's DET 100a instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the level 1 gateway would instruct the PVC controller 415 to control the ATM switch 401 to establish an upstream virtual circuit for control signals sent from the DET 100a up through the fiber-coax network and receiver 308 to the VIP's level 2 gateway. The combination of upstream and downstream, point to point channels are used for downloading of operating system and applications software and for interactive service communications in essentially the same manner as in the copending application Ser. No. 08/250,791.

Once the interactive session is established, the level 2 gateway 403 executes a two-way communication with the DET 100a through an X.25 network 211 connected to the optical receiver 308 and the signaling channel to determine if the operating system software stored in the DET 100 is compatible with the VIP's service applications. If not, the operating system software is modified in the manner discussed above relative to FIG. 2. Once the operating system software in the DET is compatible with the VIP's services, the level 2 gateway sends a command to the DET 100 through the ATM switch 401 and a corresponding broadcast control channel signaling channel instructing the DET to accept new application programming software.

Alternately, the X.25 network 211 may be routed to the ATM switch 401 to enable the DET 100a to be fully interactive with any local VIP server 403 that is connected to the ATM switch 401. In such an arrangement, the ATM switch would control the upstream and downstream signal paths between the DET and the VIP server.

The MPEG system demultiplexer 127 circuitry recognizes packets in the MPEG data stream received over the broadband channel as video, audio or data. Video and audio packets are routed to the appropriate decoders 129, 131, but the data is routed to the microprocessor 110 within the CPU 105 for further processing. For example, in response to the instruction regarding application programming software, data routed to the CPU 105 is loaded into volatile memory (RAM) 122 for subsequent use in controlling operations of the DET 100. A security code may also be transmitted to permit overwriting of all or selected portions of the operating system software stored in the non-volatile memory (NVRAM) 121, e.g. as part of the procedure for recognizing a level 2 gateway authorized to access the operating system.

When another provider is selected, either after completion of an ongoing session or after a later turn-off and turn-on of the DET, the DET 100 will receive at least another downloaded application software program appropriate to the newly selected provider. The latest received application software is written into the RAM 122 of the DET over the previously stored software. Alternatively, if a particular provider desires to substitute a second application program during a single session, e.g. to shift from a video on demand application to a video game application, the provider's level 2 gateway could send an appropriate control code through the signalling link followed by transmission of the new program software through the broadband channel and overwriting of the program in the RAM 122.

FIG. 4 depicts a NIM 101 for interfacing a DET to the network of FIG. 3. The structure illustrated is based in part on the preference for the QAM modulation techniques for the digital video signals in a network of the type shown in FIG. 3. The input to the NIM is a broadband RF signal provided from a coaxial distribution drop. The tuner 501 selects a specific 6 MHz channel from the broadband input spectrum and presents it at an intermediate frequency to the digital communications section 503, and through the IF output port to an analog video/audio demodulator 505. Although illustrated as part of the NIX, the demodulator may be an element of the host DET. The baseband audio video signals are selectively supplied as alternate outputs to the baseband output terminals and as alternate inputs to the RF output modulator 139 (see FIG. 1). The digital communications section 503 includes a QAM demodulator 503a that performs adaptive equalization, demodulation and forward error correction on signals in a specified one of the digital channel slots from the tuned RF channel and outputs a corrected serial baseband digital feed. The decryption module 507, when properly authorized by the video manager 417 and ACC 4000D 331, decrypts packets identified by selected MPEG PIDs, as directed by the DET microprocessor, via the host interface 509 and the NIM controller 510. The composite MPEG transport multiplex with appropriately decrypted components is output from the NIM 101 to the host DET's demultiplex and decompression circuitry as shown in detail in FIG. 1.

In the illustrated preferred embodiment, communication between the host microprocessor 110 and the NIM 101 is via a dual port memory connected as the NIM host interface 509. The shared memory provides mailboxes and buffer regions which are used to transfer messages and commands between the host microprocessor and the NIM 101. Messages passing through this link include interactive traffic to the level 1 and 2 gateways, tuner control commands, specification of appropriate PIDs for decryption, general housekeeping data, etc. The shared memory also is adapted to store data automatically downloaded from the network while the host microprocessor is in idle or standby state; thus, the host microprocessor is able to load the received data during the next turn-on.

In the network of FIG. 3, the complete cable RF spectrum is input to the NIM 101 (FIG. 4) via a 75 ohm connector. The RF tuner 501 translates the desired channel, containing either digital or analog information, to a 43.75 MHz IF signal. The IF signal contains either digital or analog information. The tuner 501 utilizes a dual conversion technique with synthesized local oscillators, and has an input tuning range of 50 MHz to 860 MHz.

The 64 QAM demodulator 503a comprises three submodules: DMAU, DMDU, and FEC. This module demodulates the QAM signal to digital form, and performs forward error correction (FEC) decoding, and it provides a baseband digital signal to the Decryptor Module 507. The DMAU contains the SAW filter, the QAM demodulator, carrier and clock recovery loop components and AGC control signal generation for the tuner 501. The DMDU contains an adaptive equalizer, AGC control signal generation for the DMAU, and error generation functions for the clock and carrier recovery loops. The FEC module executes concatenated Viterbi (Trellis) and Reed Solomon error correcting functions.

The Decryptor Module 507 receives the baseband digital data information stream from the demodulator, and control/ authorization information from the NIM controller 510. When authorized, this module 507 decrypts the packets identified by appropriate PIDs in the data stream. The high speed data containing decrypted packets is then passed out of the NIM to the host terminal. This module employs a DES type decryption algorithm and a key hierarchy to provide access control and decryption. The specific algorithms may be modified through the use of a TV Pass Card which is inserted in the renewable security slot 511.

In the network of FIG. 3 signal transport over the fiber/ coax distribution system may be out of band. The interactive network interface components in the NIM 101 provide communication facilities between the terminal and the central office. The physical layer interface comprises either a 64 QAM in-band transport multiplex receiver or the frequency agile QPSK out-of-band receiver 513 illustrated in FIG. 4. A QPSK transmitter 515 relays the upstream signal over the 8–12 MH band on the coaxial drop. The medium access control and administrative functions are performed by the network controller 323 and the video manager 417. Together these elements provide a message transfer facility for interactive traffic between the central office and the DET. Although not specifically shown in FIG. 3, signalling communications to and from the gateways are routed through the ATM switch.

The NIM controller 510 (FIG. 4) provides an interface between the host DET terminal device and all elements of the network interface module (NIM) 101. All commands and messages transfer between the host and the NIM controller via the dual ported RAM type interface 509. The NIM controller 510 also handles all housekeeping functions associated with the tuner 507, QAM demodulator and decryption subsystems.

An implementation of the cyclically broadcast software control signals will now be described in connection with FIG. 3. The loop transport interface 300 is adapted to receive streams of MPEG data streams in ATM format from broadcast sources (through fiber(s) 318) and from the ATM switch 401 that services the network or the interactive video information providers. The interface 300 receives different data streams at different channel data rates, for example from 56 kbps to 6 MB/s. The loop transport interface 300 includes a video manager 417 which controls the packet handler 319 to effectively review the ATM data streams, edit the data streams to be broadcast, and output the data streams in MPEG format on specific broadcast channels. For example, a loop transport interface 300 receives VIP data signals that originate from Atlanta, Washington, D.C., New York, Chicago, and San Francisco, each of which includes geographically-specific programming; if the local loop is located in Dallas, the corresponding server of the video manager 417 would edit the information to be broadcast by removing redundant programming or programming intended to be targeted for a different geographic audience. As a result, the data from the VIPs is more efficiently broadcast, such that the remaining data may be looped for a higher rate of incidence during cyclical broadcast applications. The server of the video manager 417 may keep a database of video information providers authorized to broadcast on the network, for example, to determine what VIP data should be edited.

The video manager 417 assigns a particular VIP service to at least one assigned broadcast channel, and controls the ATM packet handler 319 accordingly. For example, a VIP offering a menu-driven movie service would be assigned broadcast channel 50, MPEG timeslot 1, a menu-driven news retrieval service would be assigned broadcast channel 51, MPEG timeslot 1, and a stock quote service without a menu service would be assigned broadcast channel 52, MPEG timeslot 3.

The video manager 417 also assigns at least one channel to transmit software control signals to the DET from the broadcast application software server 403'. For example, the video manager 417 may specify one channel to be a guide channel that continually transmits navigation software to the user in MPEG format. In one embodiment, the executable code and database information are carried in a single broadcast channel. The channel may carry similar code and data for other applications.

In an alternate example, the video manager 417 may assign channel 01, MPEG timeslot 0, to continuously transmit the executable code for the navigation software, and channel 01, MPEG timeslot 1 to transmit the broadcast channel database. If the network operator provides the navigation software service, the broadcast database information relates to all broadcast channels and programs carried on the network. The navigation software is continuously transmitted to enable a DET to download the software code into nonvolatile memory during initial turn-on and registration. Thereafter, the DET accesses the up-to-date broadcast channel database and channel mapping information during execution of the software code. Alternatively, the execution speed of the navigation program may be increased by programming the DET to download the broadcast channel database during turn-on, and periodically check another broadcast channel (e.g., channel 01, timeslot 02) for updated data.

A user of the navigation program calls up the navigation menu by pressing a "GUIDE" button on a remote control, which enables a user to access any of the video information providers identified in the broadcast channel database. This arrangement enables a Network to provide a video provider selection arrangement which makes broadcast channel allocation transparent to the user. If the navigation program is stored in the DET, the pressing of the "GUIDE" button begins execution of the guide program, which directs the DET to download any necessary data, and thereafter provides a menu for the user. If the navigation program is not stored in the DET, then the pressing of the "GUIDE" button initiates a routine in the operating system to go to the appropriate control channel (e.g., channel 01, timeslot 0) to access, capture and execute the navigation software.

Once at least the program mapping portion of the software and/or data are stored in DET memory, the DET uses that information to select program services in response to user inputs. For example, if the local NBC affiliate appears on over the air broadcast channel "4", the user can input "4" to select that program even though the network may transport that program service on any arbitrarily assigned RF channel and time slot. In this example, the DET microprocessor would access the channel map in memory to identify the RF channel and timeslot which network carries on the currently selected broadcast VIP's transmission of the local NBC affiliate's programming.

Alternatively, the network may provide multiple software broadcast control channels, one for each broadcast VIP, with a "tag" broadcast arrangement that minimizes interaction between the DET and the Network. In this tag arrangement, the video manager 417 assigns specified broadcast channels to be control channels that periodically transmit transport stream packets in MPEG format that include an information provider's directory declaration and application software. Specifically, the manager 417 directs the output of a transport stream packet having a user data adaptation field in the payload section; the user data adaptation field identifies to the DET that unique data is being provided. The user data adaptation field includes an information provider's directory declaration that identifies a specific video information provider, the corresponding broadcast channel, and the corresponding PID. The information provider's directory declaration identifies the particular VIP service, such as BVS. By providing the corresponding broadcast channel and PID of the VIP service, the DET is able to access the VIP service that is being broadcast. Thus, in accordance with the above example, the video manager 417 assigns channel 50, MPEG timeslot 0 as the control channel for a first VIP, e.g., the VIP offering the menu-driven movie service broadcast on channel 50, MPEG timeslot 1 and other broadcast services. Similarly, the video manager 417 assigns channel 51, timeslot 0 as the control channel for the a second VIP, e.g., the VIP offering the menu-driven news retrieval service assigned broadcast channel 51, timeslot 1 and other broadcast services. The video manager assigns channel 52, timeslot 2 as the control channel for the stock quote service assigned broadcast channel 52, timeslot 3 and other broadcast services.

In operation, a user would operate one or more buttons on the DET 100a or its remote control to identify a particular desired application offered by the current broadcast VIP of choice. For example, the user might activate a button corresponding to a "guide" service. In response, the DET 100a would locate and select the broadcast data stream for a selected VIP's control channel and begin receiving packets bearing the PID value assigned to the identified application. The MPEG demultiplexer 127 would recognize the transport packets as user data and route the packets to the CPU 105 for further processing. The CPU 105 would recognize certain ones of the packets as containing executable code and load the payloads thereof into system RAM 122 as executables. The CPU 105 would recognize the other packets as containing data and load the payloads thereof into system RAM 122 as processable data. Upon completion of loading, the CPU 105 retrieves the first executable instruction from RAM and begins immediate execution.

If a backup control channel is desirable, the server 417 may direct that a given control channel output a transport stream packet whereby the user data adaptation field includes an information provider's directory declaration, a broadcast channel, a PID, and a flag that identifies the new packet as containing additional control channel information. Thus, the Network can provide a backup control channel, as well as an indexed addressing scheme for the DET. Thus, the tag broadcast arrangement enables the Network to broadcast gateway parameters within an indirect index addressing scheme so that the DET can capture virtual path identifiers for Level 1 or Level 2 gateway access. Thus, a user can select a VIP service from a menu, with the access technique being transparent to the user.

Figure 5:
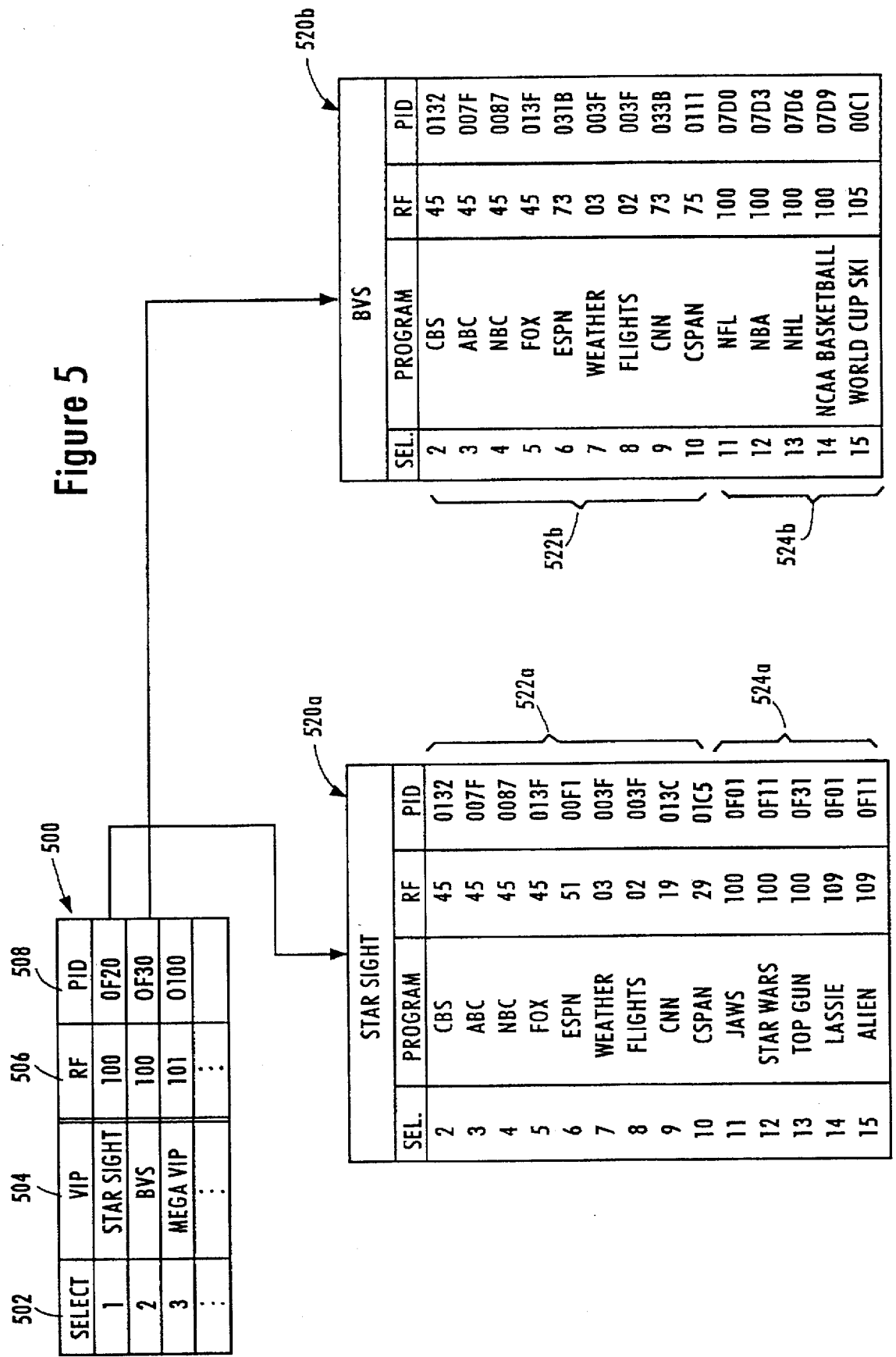
FIG. 5 illustrates one exemplary channel map structure executable by the terminal of the present invention.

FIG. 5 illustrates an exemplary program map structure received by the NIM 101 from the network. The DET 100 receives a primary program map (primary channel map) 500 which is stored in volatile memory in the DET. The primary channel map 500 stored in the DET 100 includes a list of broadcast VIPs that are available on the network. The primary channel map stores for each VIP a select key 502, a VIP label 504, an RF channel 506 and a thirteen-bit PID value 508 for the corresponding control data. The select key 502 identifies the keystroke on a user's remote used to select the particular VIP; the VIP label 504 is displayed to the user, along with the select key 502 to identify the particular VIP, after initial registration of the DET 100 on the network. The RF channel 506 and PID value 508 identify the location of the VIP's control data that is continually broadcast by the network. As discussed earlier, the network cyclically transmits each VIP's control information at a predetermined RF channel and PID value; when a user selects a particular VIP by pressing a corresponding remote key, the DET 100 will access the corresponding control data for the VIP on the basis of the stored RF channel 506 and PID value 508. For example, a user desiring to access BVS presses key "2" on his or her remote, and the DET 100 responds by accessing the program guide information supplied on the control channel for BVS located at RF channel 100 and having PID value 0F30 (hexadecimal).

After the user depresses the key for a particular VIP, the DET 100 accesses the program guide information at the corresponding RF channel and PID value and stores at least part of the information into its internal memory as a secondary program map or secondary channel map 520. The secondary program map 520 is stored until a new VIP is selected. Thus, the secondary program map 520 will not be erased when the DET 100 is put into a standby mode. Alternatively, the DET 100 can default on turn-on to show the available VIPs from the primary program map 500. The secondary program map will be deleted after a predetermined interval, for example at the end of a week as old data, at which point new data from the VIP will be available.

As shown in FIG. 5, each secondary program map comprises a reserved section 522 and a special services section 524. The reserved section 522 refers to portions of the secondary channel map 520 that are designated by the video manager 417 as reserved for common broadcast data. For example, a user may desire access to popular network services, regardless of the particular VIP being accessed. Therefore, selection items 2–10 are designated to provide identical services, regardless of the VIP being accessed. Therefore, a user who presses key "2" will obtain the control channel information for CBS, regardless of whether the user has previously selected StarSight or BVS. The control channel information at RF channel 45, PID value 0132 identifies the RF channels and PID values for the corresponding audio and video MPEG-2 packets, closed-captioning, etc. Similarly, the user obtains the control channels for ABC, NBC, FOX, CSPAN, etc. by pressing keys "3", "4", "5", and "10", respectively. For data-only channels, such as for local weather forecasts or local airport flight information, the RF and PID values stored in the secondary map 520 identifies the actual MPEG-2 stream transmitting the respective data.

Each secondary channel map 520 also includes a special services section 524 which includes the RF and PID values for the specific services provided by the selected VIP. For example, program map 520a includes a special services section 524a that identifies at selections 11–15 popular movies that are provided by the VIP StarSight; similarly, the program map 520b includes a section 524b that identifies at selections 11–15 exemplary sports programming provided by the VIP BVS. Thus, each VIP broadcasts a data carousel, i.e., program map 520, which identifies the services provided by the VIP. In addition, each VIP provides popular broadcast services in reserved areas, in accordance with predetermined assignments designated by the video manager 417.

Alternatively, each VIP may identify popular broadcast services provided from another network source. As shown in FIG. 5, the secondary program maps 520a and 520b both provide the same RF and PID values for CBS, ABC, NBC, and FOX. Thus, the disclosed arrangement enables VIPs to share sources within the reserved section 522. The shared network source may be another VIP or over-the-air data received by the network itself along path 316 shown in FIG. 3.

During viewing of a program, a user accesses the secondary channel map 520 by pressing a "GUIDE" key on his or her remote control; if the secondary program map 520 is not stored in memory, the DET will display the selection and VIP labels 502 and 504 from the primary channel map 500. Alternatively, the user can access the primary channel map 500 by pressing the "GUIDE" key twice on the remote control.

Also, the DET relies on the secondary channel map for channel selection. For example, assume that a viewer has selected the VIP Starsight. The DET memory therefore has obtained and stored the secondary program map 520a, shown in FIG. 5. By pressing the number 9 or pressing up and down keys to reach channel 9, the user inputs an instruction to select Starsight's broadcast of CNN. The DET microprocessor 110 accesses the table 520a and retrieves the RF channel number and the PID value for Starsight's broadcast of CNN, i.e. RF channel 19, PID value 013C. The DET microprocessor 110 supplies the RF channel number to the tuner 501 in the NIM 101 to instruct the tuner to tune to RF channel number 19. The DET microprocessor 110 also supplies the PID value 013C to the MPEG system demultiplexer 127 to initiate reception and decoding of the CNN program video and audio information from the data stream on RF broadcast channel 19. The digital audio/video processor 125 therefore will begin outputting video and audio signals for the CNN program service broadcast by Starsight.

In the above example, if the viewer instead had first selected the VIP BVS, the DET memory would have stored the secondary program map 520b, shown in FIG. 5. When the viewer selects channel 9 (CNN), the DET microprocessor 110 accesses the table 520b and retrieves the RF channel number and the PID value for Starsight's broadcast of CNN, i.e. RF channel 73, PID value 033B. The DET microprocessor 110 supplies the RF channel number to the tuner 501 in the NIM 101 to instruct the tuner to tune to RF channel number 73. The DET microprocessor 110 also supplies the PID value 033B to the MPEG system demultiplexer 127 to initiate reception and decoding of the CNN program video and audio information from the data stream on RF broadcast channel 73. The digital audio/video processor 125 therefore will begin outputting video and audio signals for the CNN program service broadcast by BVS.

The DET 100 preferably receives the primary program map and permissions table from the level 1 gateway 411 shown in FIG. 3 during initialization of the DET 100, and stores the permissions table in nonvolatile memory and the default program map in volatile memory within the DET 100. The initialization is performed via a level 1 gateway session, and is typically performed for initiating new service, or for resetting service after a predetermined period (e.g., one year). In addition, the initialization may be necessary to reload the DET 100, for example after equipment failure or repair, or after hardware updates. In addition, the level 1 gateway 411 may send an instruction to the video manager 417 that RF channel and/or PID value updates are required.

There are a wide variety of uses of the software downloading function of the present invention in various networks of the types described, several of which already have been noted above. Additional representative examples of such uses follow.

In a video on demand application, the application software downloaded through a point to point connection might specify precisely how the DET will perform certain functions, such as pause. For example, one VIP's application software might specify only that when the user enters a "PAUSE" command, the DET sends a message through the signaling channel the level 2 gateway to stop the server. A finite period of time passes before the command reaches the level 2 gateway, an instruction goes to the server, the server stops actual transmission, and the last transmitted frame goes downstream and is frozen for display by the DET 100 on the subscriber's TV 100'. Another VIP might offer an enhanced pause functionality as discussed below.

With the enhanced pause functionality software downloaded to the DET memory, when a subscriber enters a "PAUSE" command, the DET 100 immediately freezes decoding and displays the last decoded frame. The viewer sees an immediate pause of the program on the television set. The DET also transmits a time stamp derived from the MPEG data of the frozen frame together with a pause command upstream to the video on demand level 2 gateway and server 252. The server stops transmitting video and stores the time stamp. When the viewer inputs a command to resume playback, the DET 100 transmits another signal to the video on demand level 2 gateway and server 252. The server resumes transmission from the frame group indicated by the time stamp. When the DET receives MPEG data for frames bearing a time stamp the same as or later than the frozen frame, the DET resumes decoding based on the newly received frame data. To the viewer, it appears as if playback resumed without jitter from the exact frame frozen at the moment of pause command input. Also, the DET will not accept additional pause commands until new video frames are received and decoded indicating actual resumption of playback.

Also, surfing of MPEG encoded broadcast channels entails certain problems involved in locking onto new MPEG data streams. Certain data is needed to lock on and begin decoding of MPEG data. In a video on demand or other interactive video transmission service, initial values for all of this data are transmitted in the first few frames of transmitted data and are retransmitted only when updates are needed. In a multi-channel broadcast service, however, the data frames and headers carrying such information are transmitted periodically in each program. The headers and data frames specify program specific information, program allocation maps, program maps, video frame rates, etc., in accord with the MPEG 2 standard outlined earlier. If this data is transmitted often to permit rapid channel changes, then the amount of program payload data decreases. If the data is transmitted less often, the DET must wait longer to obtain the data and begin actual decoding, and the viewer observes a longer waiting period between channels during each change. The present invention solves these problems by downloading an initial set of the necessary MPEG decoding data for all of a VIP's broadcast programs as part of the application software downloaded and stored in the volatile RAM 122 (e.g. as part of the navigation software/database), when the DET first accesses a broadcast service VIP. Subsequently, each time a user selects a broadcast channel, the DET utilizes the cached data for that channel to attempt to begin decoding that channel. As the DET receives and decodes different channels, the cached data is updated for each channel with any data that may have changed. The MPEG data streams, capture of data needed for decoding and an alternate solution to the channel surfing problem are discussed in more detail in commonly assigned application Ser. No. 08/249,572, filed May 26, 1994 entitled "Method and Apparatus for Rapid Channel Change Selection and Simulated Fast Forward/Reverse" (attorney docket no. 680-086), the disclosure of which is incorporated herein entirely by reference.

The method of downloading applications to a DET over a digital broadcast channel can transport a variety of other applications in combination with or separate from the program guide application. For example, one application might permit programming of the DET to turn on and select a specific channel from the guide at a certain time (corresponding to a program shown in the guide) and concurrently transmit infrared signals to turn on a VCR and record the decoded program. Also, once downloaded, other applications may run in the background behind decoding of selected MPEG program channels and/or viewing of the program guide. For example, the DET may monitor data packets inserted in a regular broadcast television program stream to capture certain periodically broadcast information, such as sports scores. The DET would then display selected information from that received, e.g. the score of the game for the user's favorite football team.

The present invention is amenable to a wide variety of enhancements, as will be apparent to readers who are skilled in video and data communications arts. For example, the current software implementations of the network and the DET discussed above are based on an assumption that all interactive broadband calls are initiated as outgoing calls from an end user to a service provider or "VIP". This is referred to as a "pull" model in that the subscriber must initiate withdrawal or "pull" desired information from a service vendor. In such an arrangement, the DET will not receive unsolicited calls. This provides the subscriber with a high level of privacy. For example, the DET will not receive unsolicited junk mail type advertising from vendors the subscriber has not deliberately called. The network, however, can be used to receive advertising or mail type information, but the subscriber must initiate a request for the information from a storage device operated by a service provider. If desired, the software of the network and the DET could be modified to permit incoming calls to the DET, as well as outgoing calls.

Although preferred embodiments of the digital entertainment terminal, a digital video distribution network, and methods of programming the terminal, in accord with the invention have been described in detail above, it should be clear that the present invention is capable of numerous modifications as would be apparent to one of ordinary skill in the art. Such modifications fall within the purview of the appended claims.

What is claimed is:

1. An information distribution system comprising:

a communication network carrying broadcast digital broadband channels of audio/video program information in compressed, digital form from at least one video information provider, said communication network cyclically broadcasting on at least one of said digital broadband channels a software control signal corresponding to said at least one video information provider, said software control signal including data for identifying said audio/video program information of said at least one video information provider to a digital entertainment terminal receiving said digital broadband channels and executable code for controlling the digital entertainment terminal; and means for broadcasting said digital broadband channels to said digital entertainment terminal.

2. An information distribution system comprising:

a communication network carrying broadcast digital broadband channels of audio/video program information in compressed, digital form from at least one video information provider, said communication network cyclically broadcasting on at least one of said digital broadband channels a software control signal corresponding to said at least one video information provider, said software control signal identifying said audio/video program information of said at least one video information provider to a digital entertainment terminal receiving said digital broadband channels; and means for broadcasting said digital broadband channels to said digital entertainment terminal;

wherein said software control signal comprises navigation software adapted to be executed by said digital entertainment terminal and identifying said audio/video program information corresponding to said at least one video information provider.

3. A system as recited in claim 2, wherein said audio/video program information comprises a list of services provided by said at least one video information provider and information identifying a network channel carrying each service in said list.

4. A system as recited in claim 3, wherein said network carries a plurality of said audio/video program information from a corresponding plurality of said video information providers, said navigation software identifying each of said plurality of audio/video program information of said respective video information providers.

5. A system as recited in claim 2, wherein said network carries a plurality of said audio/video program information from a corresponding plurality of said video information providers, said navigation software identifying each of said plurality of audio/video program information of said respective video information providers.

6. A system as recited in claim 5, wherein said navigation software comprises executable code broadcast on a first transport stream of said at least one of said digital broadband channels.

7. A system as recited in claim 6, wherein said navigation software further comprises network database data broadcast on a second transport stream of said at least one of said digital broadband channels.

8. A system as recited in claim 7, wherein said navigation software further comprises update network database data broadcast on a third transport stream of said at least one of said digital broadband channels.

9. A system as recited in claim 5, wherein said software control signal is broadcast within a transport stream packet having an MPEG format.

10. A system as recited in claim 2, wherein said audio/video program information comprises one of audio/video display data, text data, and a list of services provided by said at least one video information provider.

11. A system as recited in claim 1, wherein said network cyclically broadcasts a plurality of said software control signals corresponding to a respective plurality of said video information providers on said at least one digital broadband channel, said plurality of software control signals adapted to be downloaded by said digital entertainment terminal during scanning of said digital broadband channels to identify said audio/video program information corresponding to each of said video information providers.

12. An information distribution system comprising:
a communication network carrying broadcast digital broadband channels of audio/video program information in compressed, digital form from at least one video information provider, said communication network cyclically broadcasting on at least one of said digital broadband channels a software control signal corresponding to said at least one video information provider, said software control signal identifying said audio/video program information of said at least one video information provider to a digital entertainment terminal receiving said digital broadband channels; and means for broadcasting said digital broadband channels to said digital entertainment terminal;

wherein said network cyclically broadcasts a plurality of said software control signals corresponding to a respective plurality of said video information providers on said at least one digital broadband channel, said plurality of software control signals adapted to be downloaded by said digital entertainment terminal during scanning of said digital broadband channels to identify said audio/video program information corresponding to each of said video information providers, and wherein each of said software control signals comprises navigation software adapted to be executed by said digital entertainment terminal and identifying said audio/video program information of said corresponding video information provider.

13. A system as recited in claim 12, wherein said audio/video program information comprises a list of services provided by said at least one video information provider and information identifying a network channel carrying each service in said list.

14. A system as recited in claim 11, wherein each of said software control signals are broadcast within a respective transport stream packet having an MPEG format.

15. An information distribution system comprising:
a communication network carrying broadcast digital broadband channels of audio/video program information in compressed, digital form from at least one video information provider, said communication network cyclically broadcasting on at least one of said digital broadband channels a software control signal corresponding to said at least one video information provider, said software control signal identifying said audio/video program information of said at least one video information provider to a digital entertainment terminal receiving said digital broadband channels; and means for broadcasting said digital broadband channels to said digital entertainment terminal;

wherein said network cyclically broadcasts a plurality of said software control signals corresponding to a respective plurality of said video information providers on said at least one digital broadband channel, said plurality of software control signals adapted to be downloaded by said digital entertainment terminal during scanning of said digital broadband channels to identify said audio/video program information corresponding to each of said video information providers, wherein each of said software control signals are broadcast within a respective transport stream packet having an MPEG format, and wherein each of said respective transport stream packet comprises a payload section having a user data adaptation field that stores said respective software control signal as an information provider's directory declaration, said payload section further comprising a broadcast channel field and PID number field that correspond to said information provider's directory declaration.

16. A system as recited in claim 15, wherein said broadcast channel field and PID number field identify a second stream packet having a secondary software control signal, said transport stream packet storing an index of said respective video information provider.

17. A digital entertainment terminal comprising:
a network interface module adapted to couple the terminal to a communication network for receiving a plurality of digital broadband channels at least one of which carries audio/video program information in compressed, digital form;

a control processor controlling operations of the terminal and adapted to receive a software control signal cyclically transmitted through one of said digital broadband channels, said software control signal including data corresponding to at least one video information provider and executable code for controlling the digital entertainment terminal;

means for receiving inputs from a user and providing corresponding signals to said control processor;

a system memory for storing software for processing by said control processor and being adapted to receive at least a portion of said software over said communication network; and an audio/video processor responsive to compressed, digital audio and video information and controlled by said control processor during processing of said software;

wherein said control processor captures said software control signal from said one of the digital broadband channels within a predetermined cycle and processes said captured software control signal to output, to said audio/video processor, information identifying audio/video program information from at least one broadband channel as corresponding to said at least one video information provider.

18. A digital entertainment terminal, comprising:

a network interface module adapted to couple the terminal to a communication network for receiving a plurality of digital broadband channels at least one of which carries audio/video program information in compressed, digital form;

a control processor controlling operations of the terminal and adapted to receive a software control signal cyclically transmitted through one of said digital broadband channels and corresponding to at least one video information provider;

means for receiving inputs from a user and providing corresponding signals to said control processor;

a system memory for storing software for processing by said control processor and being adapted to receive at least a portion of said software over said communication network; and an audio/video processor responsive to compressed, digital audio and video information and controlled by said control processor during processing of said software;

wherein said control processor captures said software control signal from said one of the digital broadband channels within a predetermined cycle and processes said captured software control signal to output, to said audio/video processor, information identifying audio/video program information from at least one broadband channel as corresponding to said at least one video information provider, and wherein said system memory comprises a non-volatile memory that stores a control channel scanning operation executable by said control processor.

19. A digital entertainment terminal as recited in claim 17, wherein said control processor scans a plurality of said digital broadband channels to identify and receive said at least one software control signal.

20. A digital entertainment terminal, comprising:

a network interface module adapted to couple the terminal to a communication network for receiving a plurality of digital broadband channels at least one of which carries audio/video program information in compressed, digital form;

a control processor controlling operations of the terminal and adapted to receive a software control signal cyclically transmitted through one of said digital broadband channels and corresponding to at least one video information provider;

means for receiving inputs from a user and providing corresponding signals to said control processor;

a system memory for storing software for processing by said control processor and being adapted to receive at least a portion of said software over said communication network; and an audio/video processor responsive to compressed, digital audio and video information and controlled by said control processor during processing of said software;

wherein said control processor captures said software control signal from said one of the digital broadband channels within a predetermined cycle and processes said captured software control signal to output, to said audio/video processor, information identifying audio/video program information from at least one broadband channel as corresponding to said at least one video information provider, wherein said control processor scans a plurality of said digital broadband channels to identify and receive said at least one software control signal, and wherein said received software control signal comprises navigation software for processing by said control processor for identifying said audio/video program information corresponding to said at least one video information provider.

21. A digital entertainment terminal as recited in claim 20, wherein said navigation software is stored in said non-volatile memory, said software control signal further comprising network database data identifying a plurality of said audio/video program information of a corresponding plurality of said video information providers.

22. A digital entertainment terminal as recited in claim 21, wherein said navigation software and said network database data are received from a first and second MPEG transport stream from said digital broadband channels, respectively.

23. A digital entertainment terminal as recited in claim 20, wherein said navigation software is executed by said control processor in response to a guide input from said user received by said receiving means.

24. A digital entertainment terminal as recited in claim 19, wherein said control processor stores in said system memory a plurality of said received software control signals corresponding to a plurality of said video information providers, respectively, each of said software control signals identifying audio/video program information of corresponding video information providers.

25. A digital entertainment terminal as recited in claim 24, wherein each of said received software control signals are received within a corresponding transport stream packet having an MPEG format, each of said transport stream packets comprising a payload section having a user data adaptation field that stores said respective software control signal as an information provider's directory declaration, said payload section further comprising a broadcast channel field and PID number field that correspond to said information provider's directory declaration.

26. A digital entertainment terminal as recited in claim 17, wherein said control processor captures said software control signal in response to a guide input from said user received by said receiving means.

27. A digital entertainment terminal as recited in claim 26, wherein said captured software control signal comprises navigation software for processing by said control processor for identifying said audio/video program information corresponding to said at least one video information provider.

28. A method for broadcasting audio/video program information for use by a digital entertainment terminal, comprising the steps of:

receiving audio/video program information from at least one video information provider;

assigning said received audio/video program information to at least one of a plurality of broadcast digital broadband channels;

broadcasting said received audio/video program information in compressed, digital form on said at least one of said broadcast digital broadband channels;

cyclically broadcasting on one of said broadcast digital broadband channels a software control signal corresponding to said video information provider, said software control signal including data identifying said audio/video program information of said at least one video information provider to said digital entertainment terminal and including executable code for controlling the digital entertainment terminal.

29. A method for broadcasting audio/video program information for use by a digital entertainment terminal, comprising the steps of:

receiving audio/video program information from at least one video information provider;

assigning said received audio/video program information to at least one of a plurality of broadcast digital broadband channels;

broadcasting said received audio/video program information in compressed, digital form on said at least one of said broadcast digital broadband channels;

cyclically broadcasting on one of said broadcast digital broadband channels a software control signal corresponding to said video information provider, said software control signal identifying said audio/video program information of said at least one video information provider to said digital entertainment terminal, wherein said software control signal comprises navigation software for processing by said digital entertainment terminal and identifying said audio/video program information corresponding to said at least one video information provider.

30. A method as recited in claim 29, further comprising the step of editing a plurality of audio/video program information from a corresponding plurality of video information providers, said navigation software identifying each of said plurality of edited audio/video program information of said respective video information providers.

31. A method as recited in claim 30, wherein said receiving step includes the steps of receiving an ATM-format stream from said at least one video information provider, and extracting said audio/video information from said ATM-format stream.

32. A method as recited in claim 31, wherein said broadcasting step includes the step of converting said extracted audio/video information to an MPEG-format stream, and broadcasting said MPEG-format stream.

33. A method for broadcasting audio/video program information for use by a digital entertainment terminal, comprising the steps of:

receiving a plurality of audio/video program information from a corresponding plurality of video information providers;

assigning said plurality of received audio/video program information to broadcast digital broadband channels;

broadcasting said received audio/video program information in compressed, digital form on said broadcast digital broadband channels;

cyclically broadcasting, on at least one of said broadcast digital broadband channels, software control signals corresponding to each of said video information providers, respectively, each of said software control signals identifying said corresponding audio/video program information of said corresponding video information provider to said digital entertainment terminal and including executable code for controlling the digital entertainment terminal.

34. A method as recited in claim 33, wherein said software control signals are adapted to be downloaded during scanning of said digital broadband channels by said digital entertainment terminal to identify said audio/video program information corresponding to each of said video information providers.

35. A method for broadcasting audio/video program information for use by a digital entertainment terminal, comprising the steps of:

receiving audio/video program information from at least one video information provider;

assigning said received audio/video program information to at least one of a plurality of broadcast digital broadband channels;

broadcasting said received audio/video program information in compressed, digital form on said at least one of said broadcast digital broadband channels;

cyclically broadcasting on one of said broadcast digital broadband channels a software control signal corresponding to said video information provider, said software control signal identifying said audio/video program information of said at least one video information provider to said digital entertainment terminal, wherein said software control signals are adapted to be downloaded during scanning of said digital broadband channels by said digital entertainment terminal to identify said audio/video program information corresponding to each of said video information providers, and wherein the cyclically broadcasting step includes the step of cyclically broadcasting each of said software control signals within a respective transport stream packet having an MPEG format, each of said respective transport stream packet comprising a payload section having a user data adaptation field that stores said respective software control signal as an information provider's directory declaration, said payload section further comprising a broadcast channel field and PID number field that correspond to said information provider's directory declaration.

36. A method for receiving audio/video program information from digital broadband channels broadcast from a communication network to a digital entertainment terminal, comprising the steps of:

(1) receiving in said digital entertainment terminal at least one digital broadband channel carrying audio/video program information in compressed, digital form;

(2) receiving in said digital entertainment terminal, within a predetermined interval, at least one software control signal cyclically transmitted through one of said digital broadband channels, said at least one software control signal including data corresponding to a respective at least one video information provider that provides said audio/video program information to said communications network and executable code for controlling the digital entertainment terminal;

(3) processing said at least one software control signal to provide information identifying said audio/video program information as corresponding to said at least one video information provider; and (4) selecting said audio/video program in response to said provided information.

37. A method as recited in claim 36, wherein said step (3) comprises the steps of:

receiving an MPEG-format stream containing said software control signal;

decompressing said MPEG-format stream to recover said software control signal; and storing said recovered software control signal in a non-volatile memory in said digital entertainment terminal.

38. A method for receiving audio/video program information from digital broadband channels broadcast from a communication network to a digital entertainment terminal, comprising the steps of:

(1) receiving in said digital entertainment terminal at least one digital broadband channel carrying audio/video program information in compressed, digital form;

(2) receiving in said digital entertainment terminal, within a predetermined interval, at least one software control signal cyclically transmitted through one of said digital broadband channels, said at least one software control signal corresponding to a respective at least one video information provider that provides said audio/video program information to said communications network;

(3) processing said at least one software control signal to provide information identifying said audio/video program information as corresponding to said at least one video information provider; and (4) selecting said audio/video program in response to said provided information, wherein the step (4) comprises the steps of:

transmitting a menu command to said digital entertainment terminal via infrared transmitter using a remote control; and executing said recovered software control signal stored in said digital entertainment terminal.

39. In a network broadcasting audio/video program information through a plurality of broadband channels to a plurality of terminals connected to the network, a method comprising the steps of:

cyclically broadcasting a software application on one of the broadband channels, said software application comprising executable code and processable data;

selectively receiving the one broadband channel and capturing a copy of said software application from the cyclic broadcast in one of the terminals; and executing the code and processing at least some of the data to control operations of the one terminal relating to the broadcast audio/video program information, wherein said executing step is performed immediately after said receiving step has completed capturing said copy of said software application.

40. A method as recited in claim 39, wherein said software application comprises an instruction causing said executing step to be performed immediately after said receiving step as completed capturing said copy of said software application.

41. A method as recited in claim 40, wherein said one terminal comprises a receiver for receiving inputs from a user, said receiving step comprising the steps of receiving said inputs from said user, and selecting said one broadband channel in response to said user inputs.

42. A method as recited in claim 41, wherein said cyclically broadcasting step comprises the steps of:

receiving a plurality of audio/video program information from a corresponding plurality of video information providers;

assigning each of said plurality of received audio/video program information to a corresponding one of said broadband channels in accordance with stored transmission data tables;

generating said processable data in accordance with said stored transmission data tables; and cyclically broadcasting said software application within a predetermined interval.

43. A method as recited in claim 42, wherein said cyclically broadcasting step further includes the step of compressing said software application into a ATM-format stream for transmission on said network, said selectively receiving step further comprising the step of decompressing a received ATM-format stream to obtain said software application.

44. A method as recited in claim 39, wherein said processable data identifies a plurality of video information providers broadcast on at least one of said broadband channels.

45. A method as recited in claim 44, wherein said processable data further identifies control channels corresponding to said video information providers, respectively, said executable code executing navigation software for a selected one of said video information providers.

46. A method as recited in claim 44, wherein said executable code comprises navigation software for selecting one of said video information providers.

47. In a digital entertainment terminal adapted to receive audio/video program information broadcast from a network through one of a plurality of broadband channels, wherein said network receives said audio/video program information from at least one video information provider, a method comprising the steps of:

selectively receiving a software application cyclically broadcast in compressed, digital form on one of the broadband channels, said software application comprising executable code and processable data;

capturing a copy of said software application within one cycle of said cyclic broadcast; and executing said code and processing at least some of the data to control operations of said digital entertainment terminal relating to the broadcast audio/video program information, wherein said executing step is performed immediately after said software application is captured by said capturing step.

48. A method as recited in claim 47, wherein said executing step is performed in response to an instruction within said software application.

49. A method as recited in claim 47, wherein said processable data identifies a plurality of video information providers broadcast on at least one of said broadband channels.

50. A method as recited in claim 49, wherein said processable data further identifies control channels corresponding to said video information providers, respectively, said executable code executing navigation software for a selected one of said video information providers.

51. A method as recited in claim 49, wherein said executable code comprises navigation software for selecting one of said video information providers.

52. In a digital entertainment terminal adapted to receive audio/video program information broadcast from a network through one of a plurality of broadband channels, wherein said network receives said audio/video program information from at least one video information provider, a method comprising the steps of:

selectively receiving a software application cyclically broadcast in compressed, digital form on one of the broadband channels, said software application comprising executable code and processable data;

capturing a copy of said software application within one cycle of said cyclic broadcast; and executing said code and processing at least some of the data to control operations of said digital entertainment terminal relating to the broadcast audio/video program information, further comprising the steps of:

scanning said broadband channels to receive a plurality of said software applications identifying a plurality of said video information providers, respectively; and compiling said received software applications as a primary channel map identifying said video information providers available on said network.

53. In a network broadcasting programs received from information providers through a plurality of broadband channels, a method for providing said programs to a terminal device adapted to receive said broadband channels, the method comprising the steps of:

broadcasting a first group of programs from a first information provider over a first plurality of broadcast channels;

broadcasting a second group of programs from a second information provider over a second plurality of broadcast channels;

cyclically broadcasting program control information including executable code and processable data over at least one broadcast channel, wherein said program control information at least maps each program in the first group of programs to a channel in the first plurality of broadcast channels and maps each program in the second group of programs to a channel in the second plurality of broadcast channels;

in a terminal device:
(a) in response to a selection of the first information provider, capturing from the cyclical broadcast the program control information which maps each program in the first group of programs to a channel in the first plurality of broadcast channels,
(b) storing the captured program control information in the terminal device
(c) in response to selection of a program from the first group, accessing the stored program control information to identify a channel in the first plurality of broadcast channels as corresponding to the selected program, and
(d) selectively receiving the selected program from the identified channel.

54. In a network broadcasting programs received from information providers through a plurality of broadband channels, a method for providing said programs to a terminal device adapted to receive said broadband channels, the method comprising the steps of:

broadcasting a first group of programs from a first information provider over a first plurality of broadcast channels;

broadcasting a second group of programs from a second information provider over a second plurality of broadcast channels;

cyclically broadcasting program control information over at least one broadcast channel, wherein said program control information at least maps each program in the first group of programs to a channel in the first plurality of broadcast channels and maps each program in the second group of programs to a channel in the second plurality of broadcast channels;

in a terminal device:
(a) in response to a selection of the first information provider, capturing from the cyclical broadcast the program control information which maps each program in the first group of programs to a channel in the first plurality of broadcast channels,
(b) storing the captured program control information in the terminal device
(c) in response to selection of a program from the first group, accessing the stored program control information to identify a channel in the first plurality of broadcast channels as corresponding to the selected program, and
(d) selectively receiving the selected program from the identified channel, further comprising the steps of:

in said terminal device:
(e) in response to a selection of the second information provider, capturing from the cyclical broadcast the program control information which maps each program in the second group of programs to a channel in the second plurality of broadcast channels,
(f) storing the captured program control information in the terminal device
(g) in response to selection of a program from the second group, accessing the stored program control information to identify a channel in the second plurality of broadcast channels as corresponding to the selected program, and
(h) selectively receiving the selected program from the identified channel in the second plurality of broadcast channels.

55. A method as recited in claim 54, further comprising the steps of:

storing in said terminal device an information provider directory that at least maps said first and second information providers to said corresponding program control information cyclically broadcast over said at least one broadcast channel on one of a plurality of information packets;

in said terminal device, further comprising the steps of:
(i) generating, in accordance with said stored information provider directory, a list of said first and second information providers for display to a user,
(j) in response to a user input indicating a selection of one of said first and second information providers, accessing said stored information provider directory to identify said at least one broadcast channel and one of said information packets carrying said corresponding program control information.

56. A method as recited in claim 55, wherein each of said first and second group of programs are broadcast in an MPEG format and being identified by a broadcast channel and information packet, said terminal identifying said programs of said first and second group in accordance with said broadcast channel and information packets stored in said program control information of said first and second information providers, respectively.

57. A method as recited in claim 55, wherein said list is generated in response to a user guide input.

58. A method as recited in claim 54, wherein said terminal device comprises a memory for storing a plurality of said program control information upon capture.

59. A method as recited in claim 58, wherein said list is generated in response to a user guide input.

60. A method as recited in claim 54, wherein said terminal device comprises a memory for storing only one of said program control information when captured, said terminal device overwriting stored program control information with newly-captured program control information in response to said selection of one of said first and second information providers.

61. In a network broadcasting programs received from information providers through a plurality of broadband channels, a method for providing said programs to a terminal device adapted to receive said broadband channels, the method comprising the steps of:

broadcasting a first group of programs from a first information provider over a first plurality of broadcast channels;

broadcasting a second group of programs from a second information provider over a second plurality of broadcast channels;

cyclically broadcasting program control information over at least one broadcast channel, wherein said program control information at least maps each program in the first group of programs to a channel in the first plurality of broadcast channels and maps each program in the second group of programs to a channel in the second plurality of broadcast channels;

in a terminal device:

(a) in response to a selection of the first information provider, capturing from the cyclical broadcast the program control information which maps each program in the first program in the first group of programs to a channel in the first plurality of broadcast channels, (b) storing the captured program control information in the terminal device (c) in response to selection of a program from the first group, accessing the stored program control information to identify a channel in the first plurality of broadcast channels as corresponding to the selected program, and (d) selectively receiving the selected program from the identified channel, further comprising the steps of:

storing in said terminal device an information provider directory that at least maps said first and second information providers to said corresponding program control information cyclically broadcast over said at least one broadcast channel on one of a plurality of information packets;

in said terminal device, further comprising the steps of:

(e) generating, in accordance with said stored information provider directory, a list of said first and second information providers for display to a user, (f) in response to a user input indicating a selection of one of said first and second information providers, accessing said stored information provider directory to identify said at least one broadcast channel and one of said information packets carrying said corresponding program control information.

62. A method as recited in claim 61, wherein said list is generated in response to a user guide input.

* * * * *